US012396002B2

(12) United States Patent
Yin et al.

(10) Patent No.: US 12,396,002 B2
(45) Date of Patent: Aug. 19, 2025

(54) NETWORK CONTROLLED REPEATER (NCR) PROCEDURES TO SUPPORT TYPE 1 CONFIGURED GRANTS

(71) Applicant: Sharp Kabushiki Kaisha, Sakai (JP)

(72) Inventors: Zhanping Yin, Vancouver, WA (US); Tomoki Yoshimura, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 412 days.

(21) Appl. No.: 17/985,082

(22) Filed: Nov. 10, 2022

(65) Prior Publication Data
US 2024/0163882 A1 May 16, 2024

(51) Int. Cl.
*H04W 72/23* (2023.01)
*H04W 16/28* (2009.01)

(52) U.S. Cl.
CPC ........... *H04W 72/23* (2023.01); *H04W 16/28* (2013.01)

(58) Field of Classification Search
CPC ................. H04W 72/23; H04W 16/28; H04W 72/046; H04W 72/231; H04W 84/047; H04B 7/15528; H04B 7/15542; H04L 5/0053; H04L 5/0055
See application file for complete search history.

(56) References Cited

U.S. PATENT DOCUMENTS

| 11,375,527 B1 * | 6/2022 | Eyuboglu | H04B 7/15528 |
| 2019/0215717 A1 * | 7/2019 | Lee | H04W 72/21 |
| 2019/0215900 A1 * | 7/2019 | Pan | H04W 72/23 |
| 2022/0053433 A1 * | 2/2022 | Abedini | H04W 74/0833 |
| 2022/0394752 A1 * | 12/2022 | Baek | H04W 72/569 |
| 2023/0283358 A1 * | 9/2023 | Rudolf | H04B 7/15528 |
| 2023/0354127 A1 * | 11/2023 | Fazili | H04W 72/046 |
| 2023/0354234 A1 * | 11/2023 | Abedini | H04W 56/0045 |
| 2023/0371123 A1 * | 11/2023 | Lee | H04L 1/1812 |
| 2024/0057110 A1 * | 2/2024 | Babaei | H04W 72/232 |
| 2024/0098636 A1 * | 3/2024 | Babaei | H04W 52/0212 |
| 2024/0187085 A1 * | 6/2024 | Mcmenamy | H04B 7/15507 |
| 2024/0323857 A1 * | 9/2024 | MolavianJazi | H04W 52/367 |

OTHER PUBLICATIONS

CEWiT, IIT-K, "Discussion on Side control information to enable NR network-controlled repeaters", 3GPP TSG RAN WG1 Meeting #110, R1-2207075, Aug. 26, 2022.
Panasonic, "Discussion on side control information and NCR behavior", 3GPP TSG RAN WG1 #111, R1-2211602, Nov. 18, 2022.
Samsung, "Discussion on side control information and NCR behavior", 3GPP TSG RAN WG1 #110bis-e, e-Meeting, R1-2209744, Oct. 19, 2022.
ZTE, Sanechips, "New WID on NR network-controlled repeaters", 3GPP TSG RAN Meeting #97-e, Electronic Meeting, RP-222673, Sep. 16, 2022.

* cited by examiner

*Primary Examiner* — Afshawn M Towfighi
(74) *Attorney, Agent, or Firm* — Austin Rapp

(57) ABSTRACT

A network controlled repeater (NCR) is described. The NCR includes receiving circuitry configured to receive a radio resource control (RRC) configuration from a gNodeB (gNB) on a control link for a configured grant (CG), including resource allocation with beam indication, and uplink (UL) forwarding delay information.

2 Claims, 15 Drawing Sheets

| CG Period TDD Pattern | D | D | D | D | D | D | D | D | D | D | D | F | U | U | U | U | U |
|---|---|---|---|---|---|---|---|---|---|---|---|---|---|---|---|---|---|
| CG ON/OFF Bitmap | 0 | 0 | 0 | 0 | 0 | 0 | 0 | 0 | 0 | 0 | 0 | 0 | 0 | 1 | 0 | 0 | 1 |

Indicates slot for access link reception from UE

Indicates slot for backhaul link forwarding to gNB

NETWORK CONTROLLED REPEATER (NCR) PROCEDURES TO SUPPORT TYPE 1 CONFIGURED GRANTS

TECHNICAL FIELD

The present disclosure relates generally to communication systems. More specifically, the present disclosure relates to network controlled repeater (NCR) side information and configurations for semi-static UL transmissions with configured grants.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 5 is a diagram showing slot bitmap for CG forwarding timing indication;

DETAILED DESCRIPTION

Figure 1:
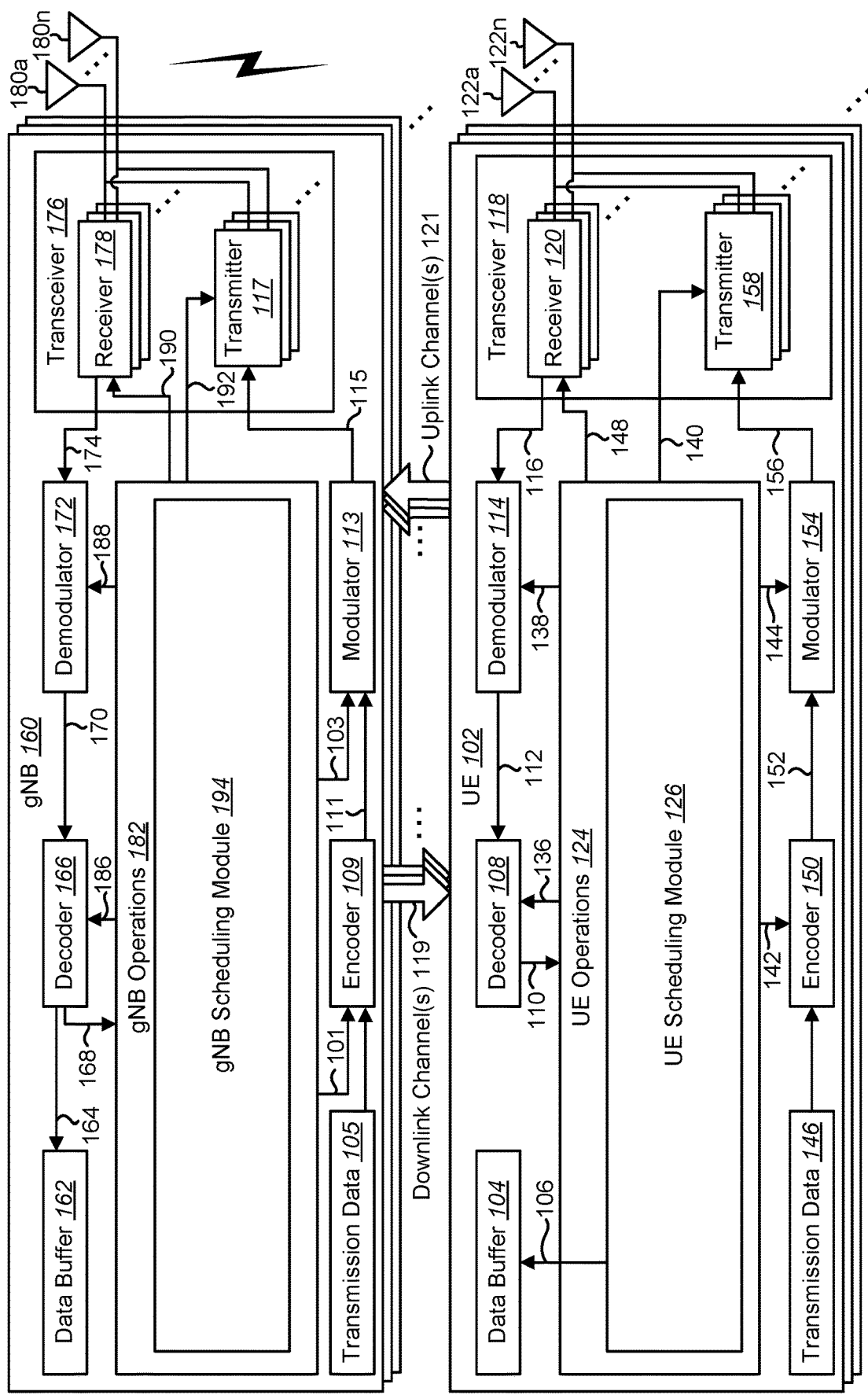
FIG. 1 is a block diagram illustrating one implementation of one or more g Node Bs (gNBs) and one or more user equipment (UEs) in which systems and methods for signaling may be implemented.

A network controlled repeater (NCR) is described. The NCR includes receiving circuitry configured to receive a radio resource control (RRC) configuration from a gNodeB (gNB) on a control link for a configured grant (CG), including resource allocation with beam indication, and uplink (UL) forwarding delay information.

In some examples, the receiving circuitry may be further configured to determine that the CG is a type 1 by receiving the ConfiguredGrantConfig-ncr including rrc-ConfiguredUplinkGrant-ncr. The receiving circuitry may also be configured to determine a periodic UL resource on an access link. In further examples, the receiving circuitry may be configured to receive and buffer a UL transmission from a user equipment (UE) on indicated resources with an indicated beam index. The receiving circuitry may also be configured to determine a UL forwarding delay based on the RRC configuration. In still yet further examples, the receiving circuitry may be configured to stop the CG if the RRC configuration is received to deactivate the CG.

The NCR may include transmitting circuitry configured to transmit a buffered signal from an access link on a backhaul link with the UL forwarding delay after an end of a CG reception on the access link.

A gNodeB (gNB) is described. The gNB includes transmitting circuitry configured to configure network controlled repeater (NCR) configured grant (CG) with radio resource control (RRC) signaling on a control link, wherein RRC parameters of ConfiguredGrantConfig-ncr include rrc-ConfiguredUplinkGrant-ncr, and wherein information includes at least resource allocation with beam indication, periodicity, and uplink (UL) forwarding delay information.

The transmitting circuitry of the gNB may be further configured to configure a CG for a user equipment (UE) with RRC signaling on a backhaul link, wherein the RRC parameters of ConfiguredGrantConfig include rrc-ConfiguredUplinkGrant. The transmitting circuitry may further be configured to determine a periodic UL resource on the backhaul link based on a CG configuration and a UL forwarding delay. In some examples, the transmitting circuitry may be configured to transmit an RRC configuration to deactivate a CG to UE on backhaul link. In still further examples, the transmitting circuitry may be configured to transmit the RRC configuration to deactivate a CG to NCR on control link.

The gNB may include receiving circuitry configured to receive a forwarded UL transmission from an NCR on the backhaul link in configured resources.

A communication method of a network controlled repeater (NCR) is described. The communication method may include receiving a radio resource control (RRC) configuration from a gNodeB (gNB) on a control link for a configured grant (CG), including resource allocation with beam indication, and uplink (UL) forwarding delay information. The communication method may also include using the RRC configurations in transmissions.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), LTE-Advanced Pro and other standards (e.g., 3GPP Releases 8, 9, 10, 11, 12, 13, 14, 15, 16, 17, and/or 18). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a g Node B (gNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An gNB may also be more generally referred to as a base station device.

It should be noted that as used herein, a "cell" may be any communication channel that is specified by standardization or regulatory bodies to be used for International Mobile Telecommunications-Advanced (IMT-Advanced) or IMT-2020, and all of it or a subset of it may be adopted by 3GPP as licensed bands or unlicensed bands (e.g., frequency bands) to be used for communication between an eNB or gNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and mMTC (massive Machine Type Communication) transmission. And, in NR, transmissions for different services may be specified (e.g., configured) for one or more bandwidth parts (BWPs) in a serving cell and/or for one or more serving cells. A user equipment (UE) may receive a downlink signal(s) and/or transmit an uplink signal(s) in the BWP(s) of the serving cell and/or the serving cell(s).

In order for the services to use the time, frequency, and/or spatial resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDSCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

Also, in a carrier aggregation (CA), the gNB 160 and the UE 102 may communicate with each other using a set of serving cells. Here a set of serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. Here, the primary cell may be always activated. Also, the gNB 160 may activate zero or more secondary cell within the configured secondary cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

Also, in a single cell operation, the gNB 160 and the UE 102 may communicate with each other using one serving cell. Here, the serving cell may be a primary cell.

In a radio communication system, physical channels (uplink physical channels and/or downlink physical channels) may be defined. The physical channels (uplink physical channels and/or downlink physical channels) may be used for transmitting information that is delivered from a higher layer and/or information that is generated from a physical layer.

PRACH

For example, in uplink, a PRACH (Physical Random Access Channel) may be defined. In some approaches, the PRACH (e.g., as part of a random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUSCH) resource).

PUCCH

In another example, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

PDCCH

In downlink, a physical downlink control channel (PDCCH) may be defined. The PDCCH may be used for transmitting downlink control information (DCI). Here, more than one DCI formats may be defined for DCI transmission on the PDCCH. Namely, fields may be defined in the DCI format(s), and the fields are mapped to the information bits (e.g., DCI bits).

PDSCH and PUSCH

A physical downlink shared channel (PDSCH) and a physical uplink shared channel (PUSCH) may be defined. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Alternatively, in a case that the PUSCH (e.g., the PUSCH resource) is scheduled by using the DCI format(s) for the uplink, the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). Here, the RRC message and/or the MAC CE are also referred to as a higher layer signal.

SS/PBCH Block

In some approaches, a physical broadcast channel (PBCH) may be defined. For example, the PBCH may be used for broadcasting the MIB (master information block). Here, system information may be divided into the MIB and a number of SIB(s) (system information block(s)). For example, the MIB may be used for carrying minimum system information. Additionally or alternatively, the SIB(s) may be used for carrying system information messages.

In some approaches, in downlink, synchronization signals (SSs) may be defined. The SS may be used for acquiring time and/or frequency synchronization with a cell. Additionally or alternatively, the SS may be used for detecting a physical layer cell ID of the cell. SSs may include a primary SS and a secondary SS.

An SS/PBCH block may be defined as a set of a primary SS (PSS), a secondary SS (SSS) and a PBCH. In the time domain, the SS/PBCH block consists of 4 OFDM symbols, numbered in terms of OFDM symbols in increasing order from 0 to 3 within the SS/PBCH block, where PSS, SSS, and PBCH with associated demodulation reference signal (DMRS) are mapped to symbols. One or more SS/PBCH blocks may be mapped within a certain time duration (e.g. 5 msec).

Additionally, the SS/PBCH block may be used for beam measurement, radio resource management (RRM) measurement and radio link monitoring (RLM) measurement. Specifically, the secondary synchronization signal (SSS) may be used for the measurement.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer where the information is used by a physical layer.

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

A network controlled repeater (NCR) can work as a physical layer repeater between a gNB and a UE.

For a UE, semi-static UL transmissions can be configured with a configured grant (CG) to perform periodic UL transmissions without dynamic DCI scheduling. The NCR cannot decode the packets between gNB and the UE. Therefore, in order to support semi-static UL transmissions from UE, the gNB need to provide some side information to NCR on the CG to perform the UL reception and forwarding functions.

Currently, how to configure the parameters for a CG on NCR is not defined yet. Also, new procedures to perform semi-static UL transmissions on the NCR-Fwd should be specified accordingly.

To support semi-static UL transmissions from UEs, a NCR should be configured with separate configured grants from UEs. The NCR CG should include at least the side information on UL resources on the access link, the type of a CG, and an UL forwarding delay for NCR transmission on the backhaul link.

For the NCR CG resource allocation, the time domain information with beam indication includes at least the starting time, duration per beam and periodicity. The frequency domain information may specify the starting PRB and a number of PRBs. In case of frequency hopping, a frequency hopping offset can be configured. The NCR CG configuration includes UL resources on both the access link and the backhaul link. The UL resources on the access link is corresponding to the UL CG transmission configured for the UE. The NCR should receive and buffer the UL transmission from the UE on the indicated access link resources. The UL resources on the backhaul link is used to forward the buffered UL transmissions from UE to the gNB.

The type of a CG can be configured explicitly, or implicitly determined by if the RRC signaling of the NCR grant configuration ConfiguredGrantConfig-ncr includes the parameter rrc-ConfiguredUplinkGrant-ncr.

The UL forwarding delay can be configured with a separate parameter with a number of slots or a number of symbols. Alternatively, it can be indicated by a second starting time, or a semi-static UL ON/OFF pattern.

The gNB and NCR procedures for semi-static UL transmissions are presented based on the type of an NCR CG.

For a Type 1 NCR CG, the gNB should separately configure a CG parameters to a UEs and the NCR vis higher layer signaling. The RRC signaling is also used for CG activation and deactivation.

For a Type 2 NCR CG, beside separately configured CG parameters to a UEs and the NCR vis higher layer signaling, the gNB also configures separate CS-RNTI-ncr for NCR CG activation and deactivation via PDCCH.

Coverage is a fundamental aspect of cellular network deployments. Mobile operators rely on different types of network nodes to offer blanket coverage in their deployments. Deployment of regular full-stack cells is one option but it may not be always possible (e.g., no availability of backhaul) or economically viable.

As a result, new types of network nodes have been considered to increase mobile operators' flexibility for their network deployments. For example, Integrated Access and Backhaul (IAB) has been introduced as a new type of network node not requiring a wired backhaul. Another type of network node is the RF repeater which simply amplify-and-forward any signal that they receive. RF repeaters have seen a wide range of deployments in 2G, 3G and 4G to supplement the coverage provided by regular full-stack cells.

While an RF repeater presents a cost effective means of extending network coverage, it has its limitations. An RF repeater simply does an amplify-and-forward operation without being able to take into account various factors that could improve performance. A network-controlled repeater is an enhancement over conventional RF repeaters with the capability to receive and process side control information from the network. Side control information could allow a network-controlled repeater to perform its amplify-and-forward operation in a more efficient manner. Potential benefits could include mitigation of unnecessary noise amplification, transmissions and receptions with better spatial directivity, and simplified network integration.

The study on NR network-controlled repeaters, multiple side control information are investigated and some of them (e.g., beam information, ON-OFF information, and TDD DL-UL configuration) are identified as necessary features with detailed design on the signaling. Solutions on repeater management may be studied to enable the network integration.

The objectives of NR NCR may focus on scenarios and assumption listed below:
- Network-controlled repeaters are inband RF repeaters used for extension of network coverage on FR1 and FR2 bands
- For only single hop stationary network-controlled repeaters
- The NCR is transparent to the UE
- Network-controlled repeater can maintain the gNB-repeater link and repeater-UE link simultaneously With these considerations, NR NCR supports the following features:
- Specify the signaling and behavior of the following side control information for controlling the NCR-Fwd in the areas of Beamforming, UL-DL TDD operation, and ON-OFF information.
- Specify control plane signaling and procedures for the configuration of signaling for side control information indication.

Figure 2:
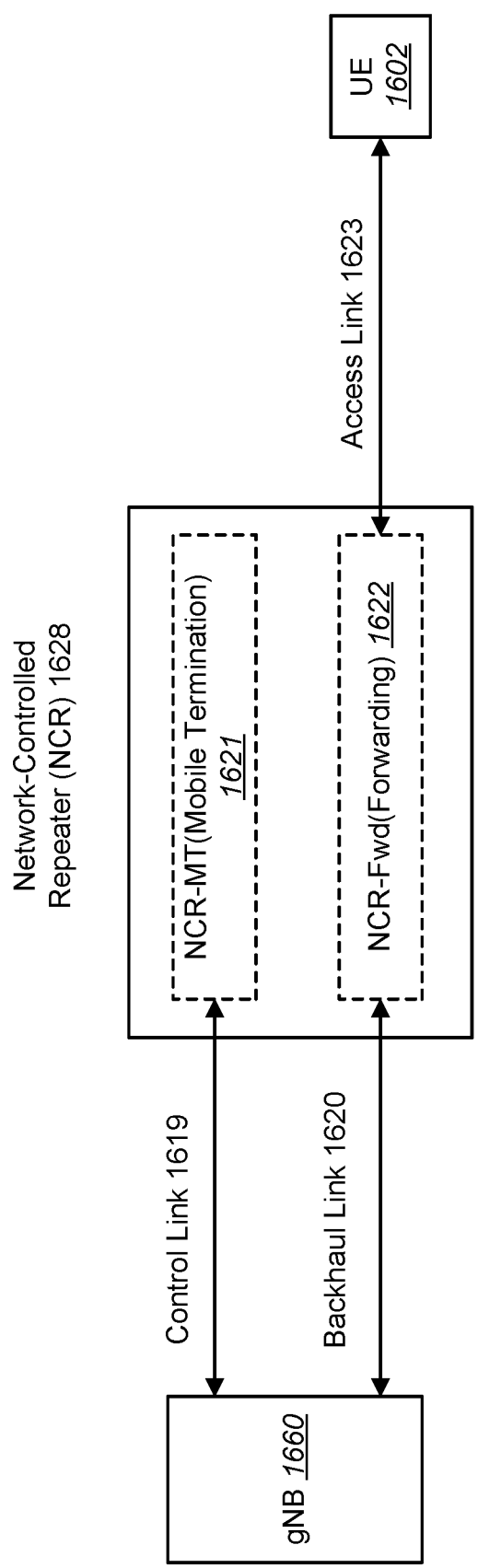
FIG. 2 is an example of a block diagram of an NCR framework.

FIG. 2 is an example of a block diagram of an NCR 1628 framework. The NCR-MT 1621 (mobile termination) is defined as a function entity to communicate with a gNB 1660 via Control link 1619 (C-link) to enable the information exchanges (e.g. side control information). The C-link 1619 is based on NR UE interface. The side control information is at least for the control of NCR-Fwd 1622 (forwarding).

The NCR-Fwd 1622 is defined as a function entity to perform the amplify-and-forwarding of UL/DL RF signal between gNB 1660 and UE 1602 via backhaul link 1620 and access link 1623. The behavior of the NCR-Fwd 1622 will be controlled according to the received side control information from gNB 1660. The NCR-Fwd 1622 includes the backhaul link 1620 and the access link 1623.

The NCR 1628 can obtain the synchronization signals, e.g. SSBs and PBCH, MIB, and SIB, etc. on the NCR-MT 1621 and/or NCR-Fwd 1622. Furthermore, the NCR 1628 can receive the side information on NCR local configuration on control link 1619 with NCR-MT 1621.

The control link 1619 and the backhaul link 1620 at NCR 1628 can be performed simultaneously or in time division multiplexing (TDM). Specifically:
- The DL of C-link 1619 and DL of backhaul link 1620 can be performed simultaneously (FDM) or in TDM way.
- The UL of C-link 1619 and UL of backhaul link 1620 can be performed in TDM way.
- Multiplexing is under the control of gNB 1660 with consideration for NCR 1628 capability.
- Simultaneous transmission of the UL of C-link 1619 and UL of backhaul link 1620 is subject to NCR 1628 capability.
  - FDM may be supported, but resource collision may occur between forwarded traffic and C-link 1619.
  - If different subband regions are configured, then it is up to NCR 1628 capability.

For the TDD UL/DL configuration of network controller repeater (NCR 1628), at least semi-static TDD UL/DL configuration is needed for network-controlled repeater for links including C-link 1619, backhaul link 1620 and access link 1623. How to handle of flexible symbols should be studied further.

Note that the same TDD UL/DL configuration is always assumed for backhaul link 1620 and access link 1623. Also, the same TDD UL/DL configuration is assumed for C-link 1619 and backhaul link 1620 and access link 1623 if NCR-MT 1621 and NCR-Fwd 1622 are in the same frequency band. For the flexible symbol based on the semi-static configuration (e.g., TDD-UL-DL-ConfigCommon, TDD-UL-DL-ConfigDedicated), the default behavior of the NCR-Fwd is expected to be OFF or not forwarding over these symbols. If dynamic DL/UL operation is supported by NCR-MT and/or NCR-Fwd, the flexible symbols may follow the dynamic TDD indication from gNB 1660 to the NCR-MT and/or NCR-Fwd.

Additional side information can be signaled by the gNB 1660 to further determine the access link 1623 and backhaul link 1620 transmissions within the DL and/or UL allocations.

Within the DL slots/symbols provided by the TDD UL/DL configurations, the NCR 1628 should further decide the slots/symbols used as:
- Backhaul DL slots/symbols: the NCR 1628 receives the DL, if a slot/sym is indicated by gNB 1660 to be forwarded on access link 1623, the NCR 1628 buffers the received DL signals.
- Access DL slots/symbols: if a slot/symbol is indicated by gNB 1660 to transmit as an access DL, the NCR 1628 transmits a previously buffered DL from gNB 1660 in the slot/symbol.

Within the DL slots/symbols provided by the TDD UL/DL configurations, the NCR 1628 should further decide the slots/symbols used as:
- Access UL slots/symbols: if a slot/symbol is indicated by gNB 1660 to receive an access UL, the NCR 1628 receives a UL transmission on the access link, and buffers the UL signal.
- Backhaul UL slots/symbols: if a slot/symbol is indicated by gNB 1660 to forward signals from access link, the NCR 1628 transmits a buffered UL signal to the gNB 1660 in the slot/symbol.

Configured Grant (CG) for Periodic UL Transmissions

To support ultra-reliable and low latency communication services (URLLC) applications, 5G-NR introduced grant free uplink transmission feature a.k.a. transmission without grant, or configured grant (CG), i.e. data transmission without resource request. Transmission without grant can avoid the regular handshake delay, e.g. sending the scheduling request and waiting for UL grant allocation, and relax the stringent reliability requirements on control channels.

In 5G, PUSCH can be dynamically scheduled using following types of transmissions:
- UL grant in uplink DCI format DCI_0_0 or DCI_0_1
- UL grant in Random Access Response (RAR)
- Semi statically configured UL grant via RRC signaling The present disclosure focuses on the semi-static UL transmissions with configured grant (CG), which enables periodic UL transmissions from a UE without scheduling DCI for each PUSCH transmission.

There are two types of configured grant. For configured grant (CG) Type 1, uplink grant configuration, activation/deactivation provided by RRC signaling. RRC provides the grant configuration to UE through higher layer parameter named as ConfiguredGrantConfig including the parameter rrc-ConfiguredUplinkGrant without the detection of any UL grant in a DCI. There is no specific Activation/Release procedure provided for CG type1. RRC signaling with parameter ConfiguredGrantConfig including the parameter rrc-ConfiguredUplinkGrant implicitly mean CG Type 1 activation. Also, for release no dedicated Information Element (IE) is sent by network, in order to release the CG, network just sends RRC reconfiguration release to UE.

For configured grant Type 2, Uplink grant configuration provided via RRC signaling and its activation/deactivation via PDCCH grant (via UL DCIs). In Type 2 an additional L1 signaling (Downlink Control Indication) is introduced, where uplink is semi-persistently scheduled by an UL grant in a valid activation DCI. The Grant is activated and deactivated through DCI scrambled with CS-RNTI. RRC only provides the higher layer parameter ConfiguredGrant-Config not including rrc-ConfiguredUplinkGrant. The DCI signaling can enable fast modification of semi-persistently allocated resources. CG Type 2 scheduling activation or scheduling release happens via successful validation of DCI format. If validation is achieved, UE consider the information in the DCI format as valid activation or valid release of configured UL grant Type 2.

The IE BWP-UplinkDedicated is used to configure the dedicated (UE specific) parameters of an uplink BWP. The BWP-UplinkDedicated IE include configured grant configurations including:

configuredGrantConfig: A Configured-Grant of type1 or type2. It may be configured for UL or SUL but in case of type1 not for both at a time. Except for reconfiguration with sync, the NW does not reconfigure configuredGrantConfig when there is an active configured uplink grant Type 2. However, the NW may release the configuredGrantConfig at any time. Network can only configure configured grant in one BWP using either this field or configuredGrantConfigToAddModList.

configuredGrantConfigToAddModList: Indicates a list of one or more configured grant configurations to be added or modified for one BWP. Except for reconfiguration with sync, the NW does not reconfigure a Type 2 configured grant configuration when it is active. The network configures multiple CG configurations for one BWP with either all configurations or no configuration configured with cg-RetransmissionTimer-r16.

configuredGrantConfigToReleaseList: Indicates a list of one or more UL Configured Grant configurations to be released. The NW may release a configured grant configuration at any time.

configuredGrantConfigType2DeactivationStateList: Indicates a list of the deactivation states in which each state can be mapped to a single or multiple Configured Grant Type 2 configurations to be deactivated when the corresponding deactivation DCI is received.

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell. A part of configuredGrantConfig IE is included below for illustration of the detailed parameters.

ConfiguredGrantConfig Information Element

```
-- ASN1START
-- TAG-CONFIGUREDGRANTCONFIG-START
ConfiguredGrantConfig ::=            SEQUENCE {
    frequencyHopping                 ENUMERATED
{intraslot, interSlot}
OPTIONAL, -- Need S
    cg-DMRS-Configuration            DMRS-UplinkConfig,
    mcs-Table                        ENUMERATED {qam256,
qam64LowSE}
OPTIONAL, -- Need S
    mcs-TableTransformerPrecoder     ENUMERATED {qam256,
qam64LowSE}
OPTIONAL, -- Need S
    uci-OnPUSCH                      SetupRelease { CG-
UCI-OnPUSCH }
OPTIONAL, -- Need M
    resourceAllocation               ENUMERATED
{ resourceAllocationType0, resourceAllocationType1,
dynamicSwitch },
    rbg-Size                         ENUMERATED
{config2}
OPTIONAL, -- Need S
    powerControlLoopToUse            ENUMERATED {n0,
n1},
    p0-PUSCH-Alpha                   P0-PUSCH-
AlphaSetId,
    transformerPrecoder              ENUMERATED
{enabled, disabled}
OPTIONAL, -- Need S
nrofHARQ-Processes                   INTEGER(1..16),
    repK                             ENUMERATED {n1, n2,
n4, n8},
    repK-RV                          ENUMERATED {s1-
0231, s2-0303, s3-0000}
OPTIONAL, -- Need R
    periodicity                      ENUMERATED {
                                         sym2, sym7,
sym1x14, sym2x14, sym4x14, sym5x14, sym8x14, sym10x14,
sym16x14, sym20x14,
                                         sym32x14,
sym40x14, sym64x14, sym80x14, sym128x14, sym160x14,
sym256x14, sym320x14, sym512x14,
                                         sym640x14,
sym1024x14, sym128x14, sym2560x14, sym5120x14,
                                         sym6,
sym1x12, sym2x12, sym4x12, sym5x12, sym8x12, sym10x12,
sym16x12, sym20x12, sym32x12,
                                         sym40x12,
```

```
sym64x12, sym80x12, sym128x12, sym160x12, sym256x12,
sym320x12, sym512x12, sym640x12,
                                                    sym1280x12,
sym2560x12,
    },
    configuredGrantTimer                            INTEGER (1..64)
OPTIONAL, -- Need R
    rrc-ConfiguredUplinkGrant                       SEQUENCE {
      timeDomainOffset                              INTEGER
(0..5119),
      timeDomainAllocation                          INTEGER
(0..15),
      frequencyDomainAllocation                     BIT STRING
(SIZE(18)),
      antennaPort                                   INTEGER
(0..31),
      dmrs-SeqInitialization                        INTEGER (0..1)
OPTIONAL, -- Need R
      precodingAndNumberOfLayers                    INTEGER
(0..63),
      srs-ResourceIndicator                         INTEGER (0..15)
OPTIONAL, -- Need R
      mcsAndTBS                                     INTEGER
(0..31),
      frequencyHoppingOffset                        INTEGER (1..
maxNrofPhysicalResourceBlocks-1)
OPTIONAL, -- Need R
      pathlossReferenceIndex                        INTEGER
(0..maxNrofPUSCH-PathlossReferenceRSs-1),
      ...,
      [[
      pusch-RepTypeIndicator-r16                    ENUMERATED
{pusch-RepTypeA,pusch-RepTypeB}
OPTIONAL, -- Need M
      frequencyHoppingPUSCH-RepTypeB-r16            ENUMERATED
{interRepetition, interSlot}
OPTIONAL, -- Cond RepTypeB
      timeReferenceSFN-r16                          ENUMERATED
{sfn512}
OPTIONAL, -- Need S
      ]],
      [[
      pathlossReferenceIndex2-r17                   INTEGER
(0..maxNrofPUSCH-PathlossReferenceRSs-1)
OPTIONAL, -- Need R
      srs-ResourceIndicator2-r17                    INTEGER (0..15)
OPTIONAL, -- Need R
      precodingAndNumberOfLayers2-r17               INTEGER (0..63)
OPTIONAL, -- Need R
      timeDomainAllocation-v1710                    INTEGER (16..63)
OPTIONAL, -- Need M
      timeDomainOffset-r17                          INTEGER
(0..40959)
OPTIONAL, -- Need R
      cg-SDT-Configuration-r17                      CG-SDT-
Configuration-r17
OPTIONAL, -- Need M
      ]]
    }
OPTIONAL, -- Need R
    ...,
    [[
    cg-RetransmissionTimer-r16                      INTEGER (1..64)
OPTIONAL, -- Need R
    cg-minDFI-Delay-r16                             ENUMERATED
                                                    {sym7,
sym1x14, sym2x14, sym3x14, sym4x14, sym5x14, sym6x14,
sym7x14, sym8x14,
sym9x14, sym10x14, sym11x14, sym12x14, sym13x14,
sym14x14, sym15x14, symx16x14
                                                    }
OPTIONAL, -- Need R
    cg-nrofPUSCH-InSlot-r16                         INTEGER (1..7)
OPTIONAL, -- Need R
    cg-nrofSlots-r16                                INTEGER (1..40)
OPTIONAL, -- Need R
    cg-StartingOffsets-r16                          CG-
StartingOffsets-r16
OPTIONAL, -- Need R
```

```
    cg-UCI-Multiplexing-r16                 ENUMERATED
{enabled}                                       OPTIONAL,
-- Need R
    cg-COT-SharingOffset-r16                INTEGER (1..39)
OPTIONAL, -- Need R
    betaOffsetCG-UCI-r16                    INTEGER (0..31)
OPTIONAL, -- Need R
    cg-COT-SharingList-r16                  SEQUENCE (SIZE
(1..1709)) OF CG-COT-Sharing-r16                OPTIONAL, --
Need R
    harq-ProcID-Offset-r16                  INTEGER (0..15)
OPTIONAL, -- Need M
    harq-ProcID-Offset2-r16                 INTEGER (0..15)
OPTIONAL, -- Need M
    configuredGrantConfigIndex-r16
ConfiguredGrantConfigIndex-r16
OPTIONAL, -- Cond CG-List
    configuredGrantConfigIndexMAC-r16
ConfiguredConfigIndexMAC-r16
OPTIONAL, -- Cond CG-IndexMAC
    periodicityExt-r16                      INTEGER
(1..5120)
OPTIONAL, -- Need R
    startingFromRV0-r16                     ENUMERATED {on,
off}                                            OPTIONAL, --
Need R
    phy-PriorityIndex-r16                   ENUMERATED {p0,
p1}                                             OPTIONAL, --
Need R
    autonomousTx-r16                        ENUMERATED
{enabled}                                       OPTIONAL
-- Cond LCH-BasedPrioritization
    ]],
    [[
    cg-betaOffsetsCrossPri0-17              SetupRelease
{ BetaOffsetCrossPriSelCG-r17 }                 OPTIONAL,
-- Need M
    cg-betaOffsetsCrossPri1-r17             SetupRelease
{ BetaOffsetCrossPriSelCG-r17 }                 OPTIONAL,
-- Need M
    mappingPattern-r17                      ENUMERATED
{cyclicMapping, sequentialMapping}              OPTIONAL,
-- Cond SRSsets
    sequenceOffsetForRV-r17                 INTEGER (0..3)
OPTIONAL, -- Need R
    p0-PUSCH-Alpha2-r17                     P0-PUSCH-
AlphaSetId
OPTIONAL, -- Need R
    powerControlLoopToUse2-r17              ENUMERATED {n0,
n1}                                             OPTIONAL, --
Need R
    cg-COT-SharingList-r17                  SEQUENCE (SIZE
(1..50722)) OF CG-COT-Sharing-r17               OPTIONAL, -
- Need R
    periodicityExt-r17                      INTEGER
(1..40960)
OPTIONAL, -- Need R
    repK-v1710                              ENUMERATED
{n12, n16, n24, n32}                            OPTIONAL,
-- Need R
    nrofHARQ-Processes-v1700                INTEGER(17..32)
OPTIONAL, -- Need M
    harq-ProcID-Offset2-v1700               INTEGER
(16..31)
OPTIONAL, -- Need R
    configuredGrantTimer-v1700
INTEGER(33..288)
OPTIONAL, -- Need R
    cg-minDFI-Delay-v1710                   INTEGER
(238..3584)
OPTIONAL, -- Need R
    ]]
}
CG-UCI-OnPUSCH ::= CHOICE {
    dynamic                                 SEQUENCE (SIZE
(1..4)) OF BetaOffsets,
    semiStatic                              BetaOffsets
}
CG-COT-Sharing-r16 ::= CHOICE {
```

```
    noCOT-Sharing-r16                          NULL,
    cot-Sharing-r16                            SEQUENCE {
        duraiton-r16                           INTEGER
(1..39),
        offset-r16                             INTEGER
(1..39),
        channelAccessPriority-r16              INTEGER (1..4)
    }
}
CG-COT-Sharing-r17 ::= CHOICE {
    noCOT-Sharing-r17                          NULL,
    cot-Sharing-r17                            SEQUENCE {
        duration-r17                           INTEGER
(1..319),
        offset-r17                             INTEGER
(1..319)
    }
}
CG-StartingOffsets-r16 ::= SEQUENCE {
    cg-StartingFullBW-InsideCOT-r16            SEQUENCE (SIZE
(1..7)) OF INTEGER (0..6)                      OPTIONAL, -- Need R
    cg-StartingFullBW-OutsideCOT-r16           SEQUENCE (SIZE
(1..7)) OF INTEGER (0..6)                      OPTIONAL, -- Need R
    cg-StartingPartialBW-InsideCOR-r16         INTEGER (0..6)
OPTIONAL, -- Need R
    cg-StartingPartialBW-OutsideCOT-r16        INTEGER (0..6)
OPTIONAL -- Need R
}
BetaOffsetsCrossPriSelCG-r17 ::= CHOICE {
    dynamic-r17                                SEQUENCE (SIZE (1..4)) OF
BetaOffsetsCrossPri-r17,
    semiStatic-r17                             BetaOffsetsCrossPri-r17
}
CG-SDT-Configuration-r17 ::= SEQUENCE {
    cg-SDT-RetransmissionTimer                 INTEGER (1..64)
OPTIONAL, -- Need R
    sdt-SSB-Subset-r17                         CHOICE {
        shortBitmap-r17                        BIT STRING (SIZE (4)),
        mediumBitmap-r17                       BIT STRING (SIZE (8)),
        longBitmap-r17                         BIT STRING (SIZE (64)),
    }
OPTIONAL, -- Need S
    sdt-SSB-PerCG-PUSCH-r17                    ENUMERATED {oneEighth,
oneFourth, half, one, two, four, eight, sixteen}   OPTIONAL,
-- Need M
    sdt-P0-PUSCH-r17                           INTEGER (–16..15)
OPTIONAL, -- Need M
    sdt-Alpha-r17                              ENUMERATED {alpha0, alpha04,
alpha05, alpha06, alpha07, alpha08, alpha09, alpha1}
OPTIONAL, -- Need M
    sdt-DMRS-Ports-r17                         CHOICE {
        dmrsType1-r17                          BIT STRING (SIZE (8)),
        dmrsType2-r17                          BIT STRING (SIZE (12))
    }
OPTIONAL,--- Need M
    sdt-NrofDMRS-Sequences-r17                 INTEGER (1..2)
OPTIONAL -- Need M
}
-- TAG-CONFIGUREDGRANTCONFIG-STOP
-- ASN1STOP
```

The CG allows periodic UL transmissions without UL grant. For a PUSCH retransmission of a CG PUSCH, a dynamic UL scheduling DCI can overwrite a CG transmission.

UE Procedure for Transmitting the Physical Uplink Shared Channel

PUSCH transmission(s) can be dynamically scheduled by a UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI after the reception of higher layer parameter configuredGrantConfig not including rrc-ConfiguredUplinkGrant. If configuredGrantConfigToAddModList is configured, more than one configured grant configuration of configured grant Type 1 and/or configured grant Type 2 may be active at the same time on an active BWP of a serving cell.

PDCCH Validation for DL SPS and UL Grant Type 2

A UE validates, for scheduling activation or scheduling release, a DL SPS assignment PDCCH or a configured UL grant Type 2 PDCCH if
  the CRC of a corresponding DCI format is scrambled with
    a CS-RNTI provided by cs-RNTI or a G-CS-RNTI provided by g-cs-RNTI, and the new data indicator field in the DCI format for the enabled transport block is set to '0', and the DFI flag field, if present, in the DCI format is set to '0', and the time domain resource assignment field in the DCI format indicates a row with single SLIV, and if validation is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16.

If a UE is provided a single configuration for UL grant Type 2 PUSCH or for SPS PDSCH, validation of the DCI format is achieved if all fields for the DCI format are set according to required specifications.

If a UE is provided more than one configuration for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set according to required specifications.

If a UE is provided more than one configuration for UL grant Type 2 PUSCH or for SPS PDSCH if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Network Controlled Repeater (NCR) Side Information and Configurations for Semi-Static UL Transmissions With Configured Grants Semi-Static UL Transmission Configuration for Network-Controlled Repeater (NCR)

An NCR is a repeater, it performs physical signal receiving and forwarding without knowing the content of the signals between the gNB and the UEs. Thus, the NCR cannot decode the physical channels, and cannot get information on higher layer signaling between the UE and gNB either. Thus, the NCR does not have the configured grant information at the UE configured by the gNB.

In order to perform grant free semi-static UL transmissions from UEs, the gNB may provide some side information to the NCR on the configured grants for the associated UEs.

The NCR CGs should be configured to NCR via control link. The NCR CGs can also be named as NCR-Fwd CGs since it defines the resources for the NCR-Fwd function.

To define each CG configuration at NCR, the same information element names can be reused, e.g. configuredGrantConfig, and rrc-ConfiguredUplinkGrant. Alternatively, ncr specific names can be defined, e.g. configuredGrantConfig-ncr, and rrc-ConfiguredUplinkGrant-ncr, or configuredGrantConfig-ncr-fwd, and rrc-ConfiguredUplinkGrant-ncr-fwd, etc.

The configured grant (CG) list at NCR may be separately configured from UEs. To define the CG list for NCR, the same information element names can be reused, e.g. configuredGrantConfigToAddModList, configuredGrantConfigToReleaseList, and configuredGrantConfigType2DeactivationStateList. Alternatively, ncr specific names can be defined, e.g. configuredGrantConfigToAddModList-ncr, configuredGrantConfigToReleaseList-ncr, and configuredGrantConfigType2DeactivationStateList-ncr; or configuredGrantConfigToAddModList-ncr-fwd, configuredGrantConfigToReleaseList-ncr-fwd, and configuredGrantConfigType2DeactivationStateList-ncr-fwd, etc.

The NCR list includes the CGs configured for all UEs associated with the NCR. There may be a mapping between a CG index at NCR and a CG index at a UE. Multiple CGs from one UE or from multiple UEs can be linked to a single CG configuration at NCR. Also, the NCR does not need to know the identities of the UEs for the CGs.

The NCR CG indexes are configured independently and separately from the UEs. To define the CG indexes for NCR, the same information element names can be reused, e.g. ConfiguredGrantConfigIndex and ConfiguredGrantConfigIndexMAC. Alternatively, ncr specific names can be defined, e.g. ConfiguredGrantConfigIndex-ncr and ConfiguredGrantConfigIndexMAC-ncr; or ConfiguredGrantConfigIndex-ncr-fwd and ConfiguredGrantConfigIndexMAC-ncr-fwd, etc.

Detailed Content for NCR Configured Grant Configuration

We use configuredGrantConfig-ncr to differentiate from existing configuration for UE. The gNB may provide some side information to the NCR on the configured grants. The information may include the configuration and resource on access link for the NCR to listen and buffer of UL transmission(s) from associated UE(s), and the configuration and resource on backhaul link for the NCR to forward the received UL transmission(s) from UE(s) to the gNB.

The UE and NCR have the same understanding on the TDD UL/DL configuration. Both the UL resources on the access link and the UL resources on the backhaul link should be allocated within the UL allocations determined by the TDD UL/DL configurations.

For the UE, the UL CG configuration provides detailed parameters including resource allocation, DMRS, MCS, HARQ-ACK processes, power control, etc., as provided above. The UL CG transmission from UE is transmitted on the access link for NCR.

On the other hand, the NCR does not need to know the detailed parameter for the UL transmission. It only needs to determine the time/frequency resources on access link to listen to for buffering the UL transmission from the UE. Thus, the configured grant (CG) resource information for NCR can be simpler than that for a UE. Most of the parameters in a CG configuration for UE is not needed for NCR.

Since the NCR performs amplify and forwarding of the received physical signals only, for a configured grant, the same amounts of resources should be allocated on the access link and the backhaul link. However, additional information is needed for NCR to perform the access link reception, e.g. the beam information should be additionally signaled to NCR to align the reception to the configured grant transmission from the UE. In access link, the DL beam and corresponding UL beam are associated with the same beam index. That is, in access link, a DL beam and a UL beam which are correspondent with each other have the same beam index. The beam index should be included in the CG configuration so that the NCR can align the reception with the right beam.

The resource allocation with beam information for NCR on access link should be included in the configuredGrant-Config-ncr, e.g. using the resourceAllocation information element structure. Since the NCR is a repeater, to forward a CG transmission from a UE, the amount of resources allocated for forwarding on the backhaul link should be the same as the amount of resources allocated for UL reception on the access link. That is, the duration of the UL forwarding transmission is the same on the backhaul link as the duration of UL reception configured on the access link. However, the beam used on the backhaul link should be determined or configured separately from the beams configured for the access link.

Method 1: NCR Resource Allocation Includes Time Domain Information Only

In this method, the NCR may apply a single beam only on a symbol. The NCR receives the signal in the whole BWP of the time domain resource indicated by the resource allocation without knowing the actual frequency domain allocation for the CG. A timeDomainAllocation information element structure may be used.

The time domain resource allocation can be in slot level granularity or symbol level granularity. With a slot level granularity, the NCR should receive and forward the signals of all symbols in an indicated slot. With a symbol level granularity, the NCR should receive and forward the signals of only a set of symbols in an indicated slot.

In one case, only one beam is used in the CG time domain resources. The information of a CG in a slot should include the beam index, the starting symbol, duration in a number of symbols, and the periodicity of the CG transmission in a number of symbols.

In another case, more than one beams can be used in the CG time domain resources. The information of a CG in a slot should include the beam indexes, the starting symbol and duration in a number of symbols per beam, and the periodicity of the CG transmission in a number of symbols.

Method 2: NCR Resource Allocation Includes Time Domain Information and Frequency Domain Information With Method 1, the NCR receives and forwards the signals from the whole bandwidth part (BWP) on backhaul link. The signals outside the actual CG transmission from the UE will cause extra interference other UL transmissions to the gNB. Furthermore, the reception and forwarding of the signals outside the CG transmission will lead to poor power efficiency.

To reduce the interference, and to enhance potential power management at NCR, the CG may include frequency domain allocation information beside the time domain allocation in Method 1. A frequencyDomainAllocation information element structure may be used. Thus, the NCR only needs to listen, buffer and forward the indicated resource blocks (RBs) within the BWP. Furthermore, the NCR may allocate higher transmit power to the allocated CG resource to achieve better performance.

For example, the frequency domain allocation for an NCR CG configuration may include a starting RB index and a number of RBs for the CG. In case of frequency hopping is configured, a frequencyHoppingOffset should be configured. Alternatively, a second RB index may be included.

Moreover, the type of the NCR configured grant should be indicated implicitly or explicitly. Currently, the CG type is determined by whether rrc-ConfiguredUplinkGrant is present in the RRC configuration.

In one approach, a parameter of cg-type can be configured with 0 or 1 to explicitly indicate Type 1 or Type 2. In another approach, the CG type is implicitly derived based on whether rrc-ConfiguredUplinkGrant-ncr is included in the RRC configuration or not.

If the RRC conconfiguraiton of higher layer parameters of ConfiguredGrantConfig-ncr including rrc-ConfiguredUplinkGrant-ncr, the CG is a Type 1 configured grant. And a Type 1 CG is activated and deactivated via RRC. The rrc-ConfiguredUplinkGrant-ncr should include additional time domain allocation information, such as timeDomainOffset and timeDomainAllocation. The rrc-ConfiguredUplinkGrant-ncr may also include additional frequency domain allocation information, such as frequencyDomainAllocation.

If the RRC configuration of higher layer parameters of ConfiguredGrantConfig-ncr not including rrc-ConfiguredUplinkGrant-ncr, the CG is a Type 2 configured grant. And a Type 2 CG is activated and deactivated via the PDCCH. For DCI activation and deactivation of Type 2 CG, the gNB should separately configure the NCR or NCR-MT with a CS-RNTI provided by cs-RNTI (or cs-RNTI-ncr) or a G-CS-RNTI provided by g-cs-RNTI (or g-cs-RNTI-ncr)

Furthermore, an uplink forwarding delay information should be defined between the end of access link reception to the backhaul link transmission. The UL forwarding delay can be signaled implicitly or explicitly. Since the NCR is a repeater, to forward a CG transmission from a UE, the amount of resources allocated for forwarding on the backhaul link should be the same as the amount of resources allocated for UL reception on the access link.

Method 1: Specify a UL Forwarding Delay Parameter With Higher Layer Signaling

Figure 3:
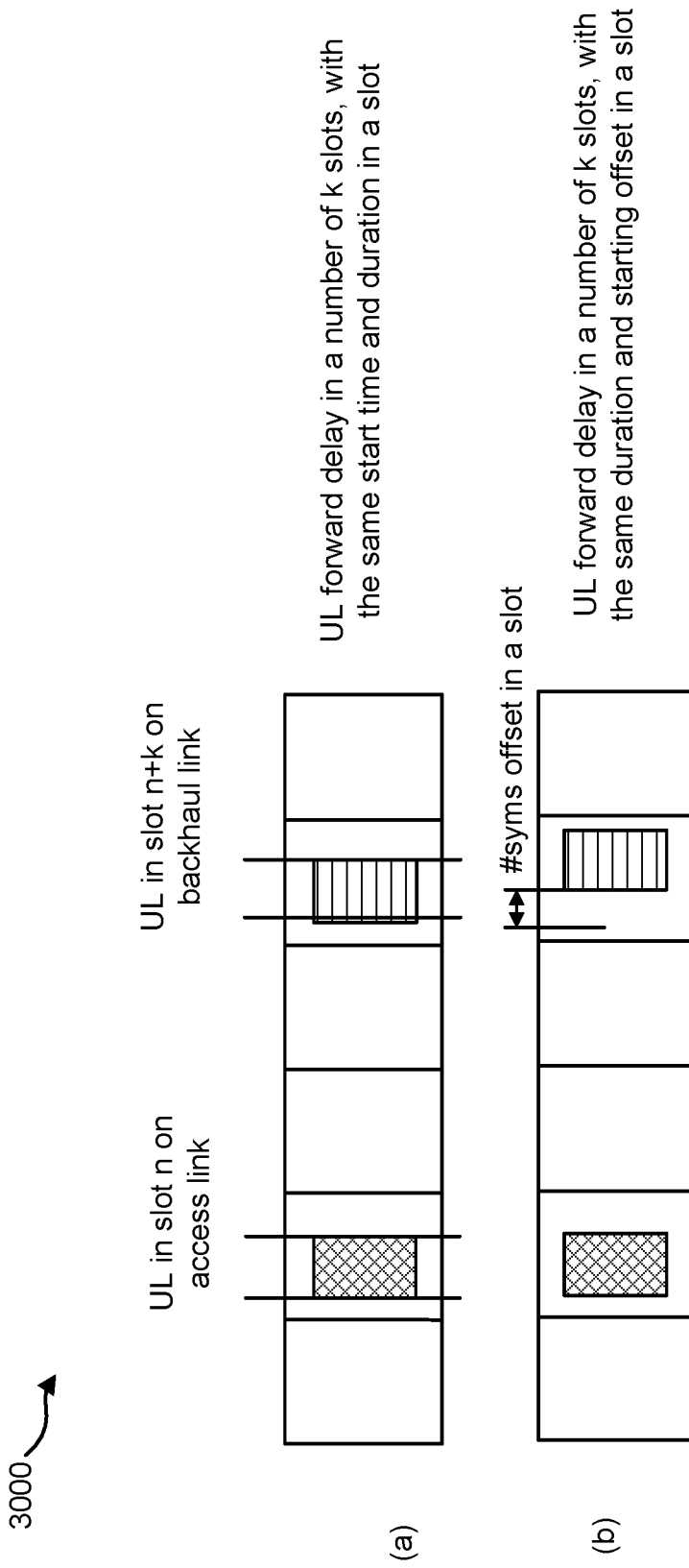
FIG. 3 is a diagram showing uplink forwarding delay in a number of slots.

FIG. 3 is a diagram 3000 showing uplink forwarding delay in a number of slots. The CG configuration configuredGrantConfig-ncr may also include a UL forwarding delay parameter (e.g. ul-delay-ncr, or ul-delay-ncr-fwd, or ncr-fwd-ul-delay, etc.) to determine the time resources for uplink forwarding on the backhaul link. The parameter define the time between the UL transmissions received by the NCR on the access link and the UL transmissions forwarded by the NCR on the backhaul link.

In one approach, the UL forwarding delay may be configured with a number of slots k. For a CG transmission from a UE in slot n on the access link, the NCR forwards the received signal in slot n+k to the gNB on the backhaul link. In one case, the same time domain and frequency domain resources are used in both slots for the CG, as shown in FIG. 3 example (a). In another case, additional time domain offset can be configured in a separate parameter, e.g. timeDomainOffset, to adjust the position of the CG forwarding transmission in slot n+k, as shown in FIG. 3 example (b). The offset value may be positive or negative. If a slot level granularity is used for the time domain resource allocation, the slot level forwarding delay is sufficient, and the delay offset within a slot is not applicable. If a symbol level granularity is used for the time domain resource allocation, the delay offset within a slot may be applicable besides the number of slots delay parameter.

Figure 4:
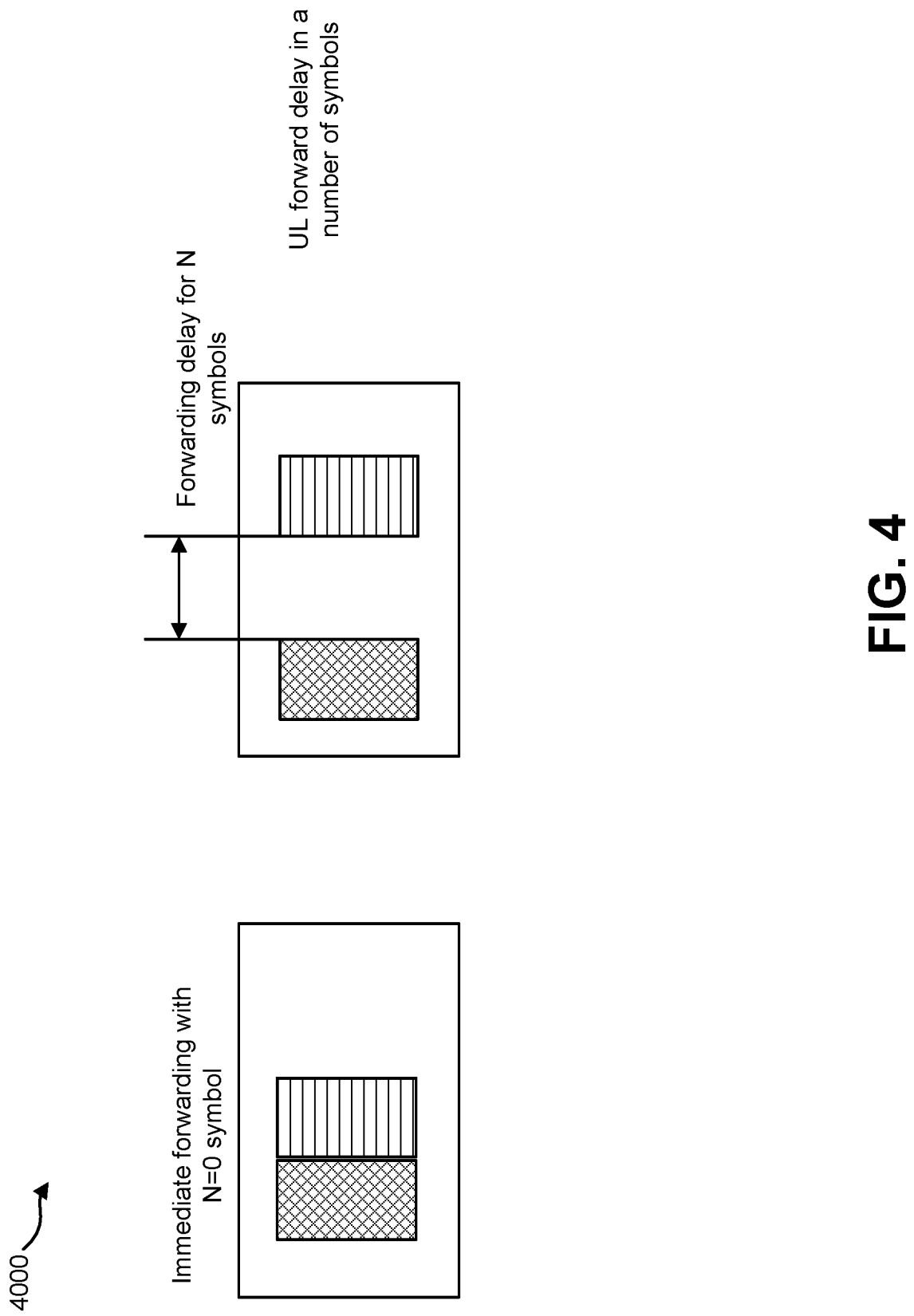
FIG. 4 is a diagram showing uplink forwarding delay in a number of symbols.

FIG. 4 is a diagram 4000 showing uplink forwarding delay in a number of symbols. In another approach, the UL forwarding delay may be configured with a number of symbols N. For a CG transmission from a UE on the access link, the NCR forwards the received signals to gNB on the backhaul link N symbols after the end of CG transmission on the access link, as shown in FIG. 4.

The UL receiving timing of the NCR-Fwd is advanced before the UL transmitting timing of the NCR-MT (or the NCR-Fwd) by the internal delay. The internal delay includes the switching time and processing time for the NCR forwarding. Thus, it is possible to have N=0 for immediate forwarding of a UL transmission from UE to the gNB, as shown in FIG. 4. Define the UL forwarding delay in a number of symbols may reduce the latency of a CG transmission.

The symbol level delay is more suitable if a symbol level granularity is used for the time domain resource allocation. If a slot level granularity is used for the time domain resource allocation, the symbol level forwarding delay may not be necessary since a single transmission should be confined within a slot, i.e. not cross a slot boundary.

In one solution, a single UL forwarding delay RRC parameter is configured applied to all CGs.

In another solution, the UL forwarding delay parameter can be configured separately for each CG. The parameter values can be the same or different for different CGs on the NCR.

Method 2: Define a Second Starting Time in the NCR CG Configuration

The access link resource allocation in time domain is defined by information including the beam indexes, the starting symbol and duration in a number of symbols per beam, and the periodicity, etc. A second starting time (e.g. startingsym-ncr, startingsym-ncr-fwd, etc.) can be configured in the configuredGrantConfig-ncr or rrc-ConfiguredUplinkGrant-ncr of the CG.

The second starting time define the starting symbol used for NCR forwarding on the backhaul link. The second starting time should be later than or align with the ending time of the CG access link resource allocation. The gap between the second starting time and the ending time of the CG access link resource allocation defines the UL forwarding delay. Since the NCR is a repeater, to forward a CG transmission from a UE, the amount of resources allocated for forwarding on the backhaul link should be the same as the amount of resources allocated for UL reception on the access link. That is, the duration of the UL forwarding transmission is the same on the backhaul link as the duration of UL reception configured on the access link.

Method 3: Specify Semi-Static ON/OFF Bitmap(s) for the for NCR Access Link and Backhaul Link Transmissions A bit map is configured to indicate the ON slots for NCR-fwd on access link and backhaul link. The bitmap is more suitable for slot level UL forwarding delay. If the bitmap is configured at symbol level, the bitmap will be redundant with the time domain allocation information.

FIG. 5 is a diagram 5000 showing slot bitmap for CG forwarding timing indication. In one approach, a single bitmap is signaled. The length of the bitmap can be the same as the periodicity of the CG. Alternatively, the length of the bitmap may include only the UL allocations in the periodicity. The bitmap may only have 2 UL slots indicated as ON by bit "1" for a CG, as shown in FIG. 5.

The first ON slot is used for access link transmission from the UE, and the second ON slot is used for NCR forwarding on the backhaul link to gNB.

In another approach, two separate bitmaps may be signaled. The first bitmap indicates ON slot(s) for the CG transmissions on the access link. The second bitmap indicate ON slot(s) for the NCR forwarding of the CG transmissions on the backhaul link. The two bitmaps provide a one-to-one ON slot mapping between the access link and the backhaul link.

For all the uplink forwarding delay indication methods, the beam information for the backhaul link may be optionally and/or additionally configured in the NCR CG configuration. Normally, the NCR backhaul link beam can be determined by control link or by explicit indication. Since the NCR is in fixed location to a gNB, the beam direction and condition could be quite stable. Thus, a higher layer configured beam may be sufficient.

Similarly, the backhaul beam index may be included in the NCR CG configuration for the UL resources on the backhaul link. A single backhaul beam may be configured for the backhaul link resource even if one or multiple beams are configured for the access link. Additionally, the gNB may configure more than one beams for the backhaul link resources, the number of beams and the duration of each beam on the backhaul link resources should be configured separately from the UL resources of the access link, i.e. the backhaul link beams use different beam indexes that are numbered separately from NCR beams.

In summary, an NCR CG configuration should include at least the following side information
 Resource allocation with beam information and periodicity
 The type of a configured grant, i.e. Type 1 or Type 2
 Forwarding delay information
Network Controlled Repeater (NCR) Procedures to Support Type 1 Configured Grants
Type 1 CG Procedure for NCR and gNB For a Type 1 CG, the gNB uses RRC configuration to start/stop the CG from a UE. Since the NCR is transparent to the UE, the UE follows the CG configuration and transmit on the access link in the indicated UL resources. No new UE behavior is needed.

The NCR cannot decode the RRC information and physical signals between the gNB and a UE. To support a CG on a UE, the NCR should be configured with a corresponding NCR CG to receive the CG transmissions from the UE, and to forward the CG signals to gNB on the backhaul link. Thus, parallel RRC signaling on NCR CG configuration should be issued to NCR bedside RRC signaling on CG configuration to the UE.

The order of RRC configuration for NCR and the RRC configuration for UE can be flexible if the procedure can be completed before the actual CG transmission.

Figure 6:
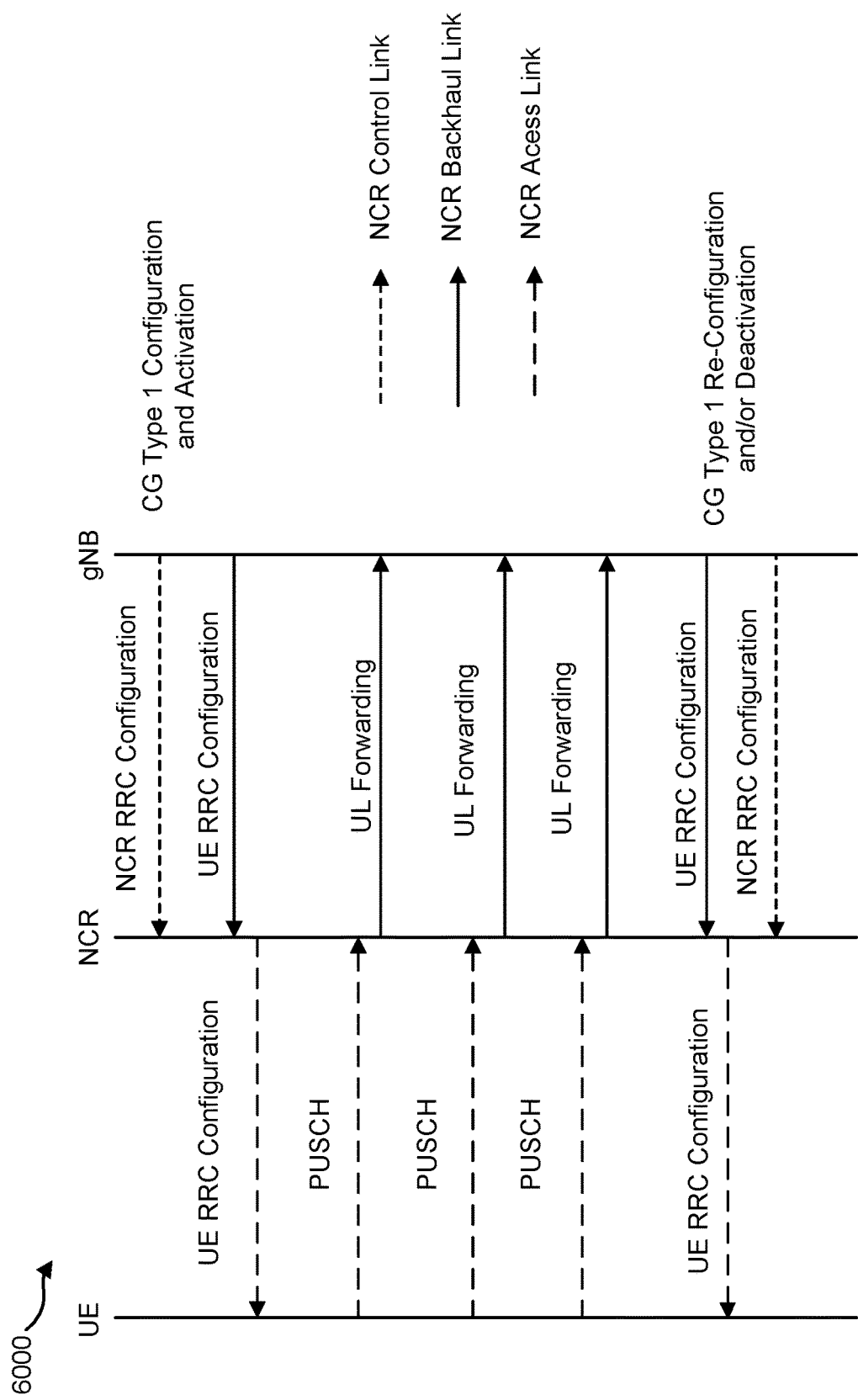
FIG. 6 is a diagram showing message/packet exchanges among the gNB, the NCR, and the UE.

FIG. 6 is a diagram 6000 showing the message/packet exchanges among the gNB, the NCR and the UE. FIG. 6 illustrates Type 1 CG configuration and transmission with NCR. The NCR control link is the link between the gNB and the NCR used for control information to and from NCR. The NCR backhaul link is the link between the gNB and the NCR used for data forwarding to and from the gNB. The NCR access link is the link between the NCR and the UE used for data forwarding to and from the UE.

The detailed procedures and behaviors of the NCR are given below.
NCR behavior
　1. Receive a RRC configuration from gNB on the control link for a configured grant, including resource allocation with beam indication, and a UL forwarding delay information; (note: the NCR forwarding of the PDSCH with RRC configuration for UE may follow a separate dynamic DL forwarding procedure, which is not included here)
　2. Determine the configured grant is Type 1 by receiving the ConfiguredGrantConfig-ncr including rrc-ConfiguredUplinkGrant-ncr;
　3. Determine the periodic UL resource on access link; and 4. Receive and buffer the UL transmission from UE on the indicated resources with the indicated beam index;
 5. Determine the UL forwarding delay based on the RRC configuration; and
 6. Transmit the buffered signal from access link on the backhaul link with the UL forwarding delay after the end of the CG reception on the access link;
 7. Stop the CG if a RRC configuration is received to deactivate the CG.

The detailed procedures and behaviors of the gNB are given below.

gNB Behavior

1. Transmit a RRC configuration on a Type 1 configured grant to NCR on the control link with the ConfiguredGrantConfig-ncr including rrc-ConfiguredUplinkGrant-ncr. The information includes at least resource allocation with beam indication, periodicity and a UL forwarding delay information.
 2. Transmit a RRC configuration on the Type 1 configured grant to UE on the backhaul link with the ConfiguredGrantConfig including rrc-ConfiguredUplinkGrant. (Note: Step 1 and 2 can be switched as long as both steps are performed before the CG transmission from UE. The NCR forwarding of the PDSCH with RRC configuration for UE may follow a separate dynamic DL forwarding procedure, and is not included here.)
 3. Determine the periodic UL resource on the backhaul link based on the CG configuration and the UL forwarding delay;
 4. Receive the forwarded UL transmission from NCR on the backhaul link in the configured resources.
 5. Transmit a RRC configuration to deactivate the configured grant to UE on the backhaul link.
 6. Transmit a RRC configuration to deactivate the configured grant to NCR on the control link. (Note: Step 5 and 6 can be switched as long as both steps are performed before the next CG transmission from UE.

Network Controlled Repeater (NCR) Procedures to Support Type 2 Configured Grants Type 2 CG Procedures for NCR and gNB For a Type 2 CG, the gNB uses RRC configuration to configure the CG, but the activation and deactivation of a CG index is indicated by the HARQ-ACK index in a activation/deactivation DCI. The CG indexes at the UE is configured separately from the CG indexes at the NCR. Since the NCR may support multiple UEs, the number of CGs in the CG indexes at NCR may be much larger than that at a UE.

Since the NCR is transparent to the UE, the UE follows the CG configuration and DCI activation/deactivation to transmit on the access link in the indicated UL resources. No new UE behavior is needed.

The NCR cannot decode the RRC information and physical signals between the gNB and a UE. To support a CG on a UE, the NCR should be configured with a corresponding NCR CG to receive the CG transmissions from the UE, and to forward the CG signals to gNB on the backhaul link. Thus, parallel RRC signaling on NCR CG configuration should be issued to NCR bedside RRC signaling on CG configuration to the UE.

Furthermore, Type 2 CG supports fast response with activation and deactivation by PDCCH at UE. Thus, the corresponding Type 2 NCR CG should also support activation and deactivation by DCI via PDCCH on the control link.

With separate CG indexes at NCR, the activation and deactivation of a CG at NCR may need separate DCIs with separate CG indexes for the UE and NCR respectively.

With separate configured CGs at NCR, the gNB should also separately configure the NCR or NCR-MT with a NCR CS-RNTI provided by cs-RNTI (or cs-RNTI-ncr) or a NCR G-CS-RNTI provided by g-cs-RNTI (or g-cs-RNTI-ncr).

The order of RRC configuration for NCR and the RRC configuration for UE can be flexible as long as both are configured before the CG activation/deactivation by DCI. The order of DCI activation and deactivation for UE and NCR can be flexible as long as both are signaled and processed before the CG transmission from the UE.

Figure 7:
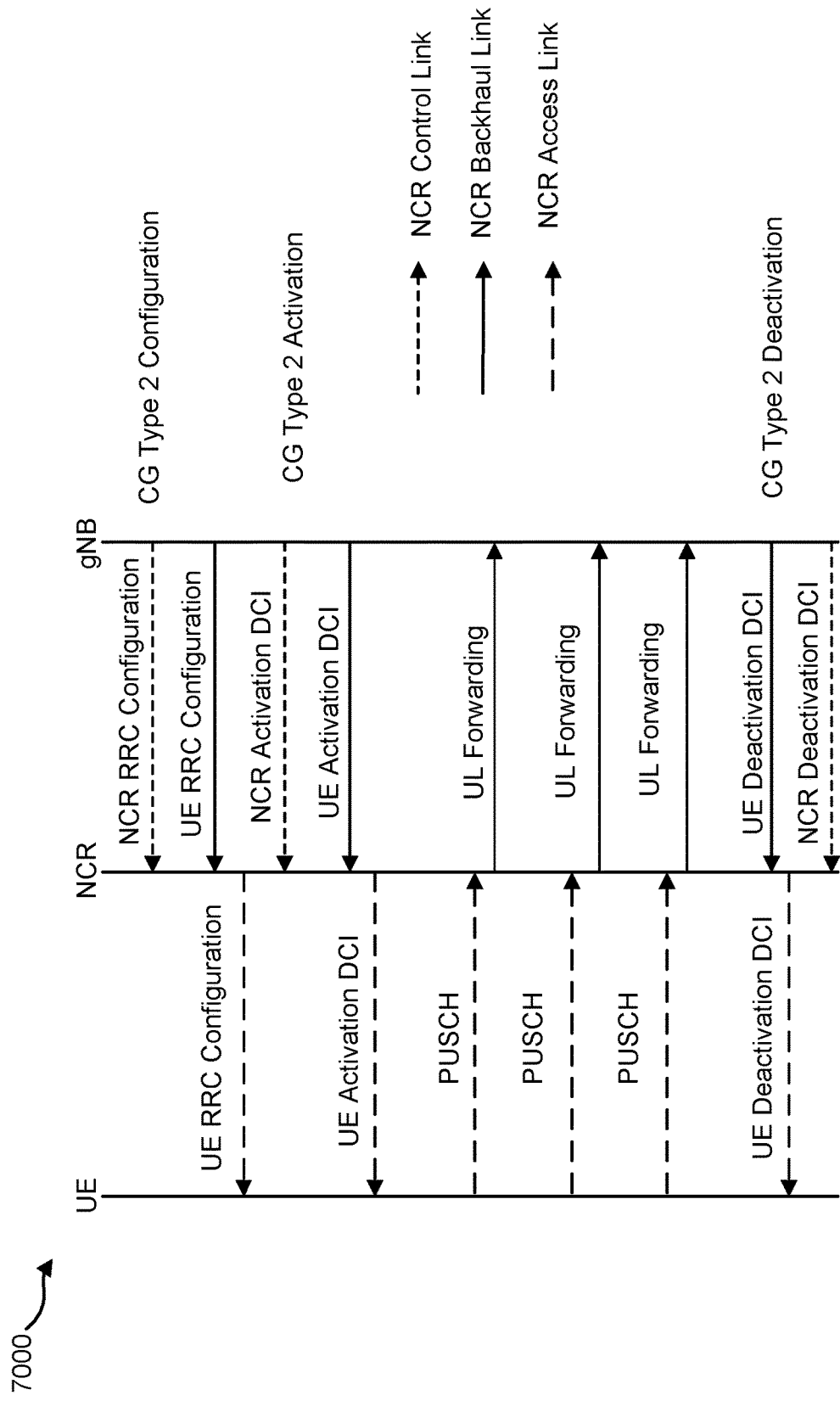
FIG. 7 is a diagram showing message/packet exchanges among the gNB, the NCR and the UE.

FIG. 7 is a diagram 7000 showing message/packet exchanges among the gNB, the NCR and the UE. FIG. 7 illustrates Type 1 CG configuration and transmission with NCR.

The detailed procedures and behaviors of the NCR are given below.

NCR Behavior

1. Receive a RRC configuration from gNB on the control link for a configured grant, including resource allocation with beam indication, a UL forwarding delay information, and a NCR CS-RNTI provided by cs-RNTI (or cs-RNTI-ncr) or a NCR G-CS-RNTI provided by g-cs-RNTI (or g-cs-RNTI-ncr);
 2. Determine the configured grant is Type 2 by receiving the ConfiguredGrantConfig-ncr not including rrc-ConfiguredUplinkGrant-ncr;
 3. Monitor the PDCCH, receive and validate an activation DCI for the configured grant;
 4. Determine the periodic UL resource on access link; and
 5. Receive and buffer the UL transmission from UE on the indicated resources with the indicated beam index;
 6. Determine the UL forwarding delay based on the RRC configuration; and
 7. Transmit the buffered signal from access link on the backhaul link with the UL forwarding delay after the end of the CG reception on the access link.
 8. Monitor the PDCCH, receive and validate a deactivation DCI for the configured grant;
 9. Stop the CG if a deactivation DCI for the configured grant is received.

The detailed procedures and behaviors of the gNB are given below.

gNB Behavior

1. Transmit a RRC configuration on the control link for a Type 2 configured grant to NCR with the ConfiguredGrantConfig-ncr not including rrc-ConfiguredUplinkGrant-ncr. The information includes at least resource allocation with beam indication, periodicity, a UL forwarding delay information, and an NCR CS-RNTI.
 2. Transmit a RRC configuration on the backhaul link for a Type 2 configured grant to UE with the ConfiguredGrantConfig not including rrc-ConfiguredUplinkGrant. (Note: Step 1 and 2 can be switched as long as both steps are performed before the DCI activation for the UE and the NCR. The NCR forwarding of the PDSCH with RRC configuration for UE may follow a separate dynamic DL forwarding procedure, which is not included here.)
 3. Transmit a PDCCH for NCR CG activation for the NCR configured grant to the NCR on the control link; and
 4. Transmit a PDCCH for CG activation for the UE configured grant to the UE on the backhaul link; and (Note: Step 3 and 4 can be switched as long as both activation DCIs are delivered before the start of CG transmission from the UE. The NCR forwarding of the PDCCH for UE may follow a separate dynamic DL forwarding procedure, which is not included here.)
5. Determine the periodic UL resource on the backhaul link based on the CG configuration and the UL forwarding delay;
6. Receive the forwarded UL transmission from NCR on the backhaul link in the configured resources.
7. Transmit a PDCCH for CG deactivation for the UE configured grant to the UE on the backhaul link to deactivate the CG; and
8. Transmit a PDCCH for NCR CG deactivation for the NCR configured grant to the NCR on the control link to deactivate the CG. (Note: Step 7 and 8 can be switched as long as both steps are performed before the next CG transmission from UE. The NCR forwarding of the PDCCH for UE may follow a separate dynamic DL forwarding procedure, which is not included here.)

Figure 8:
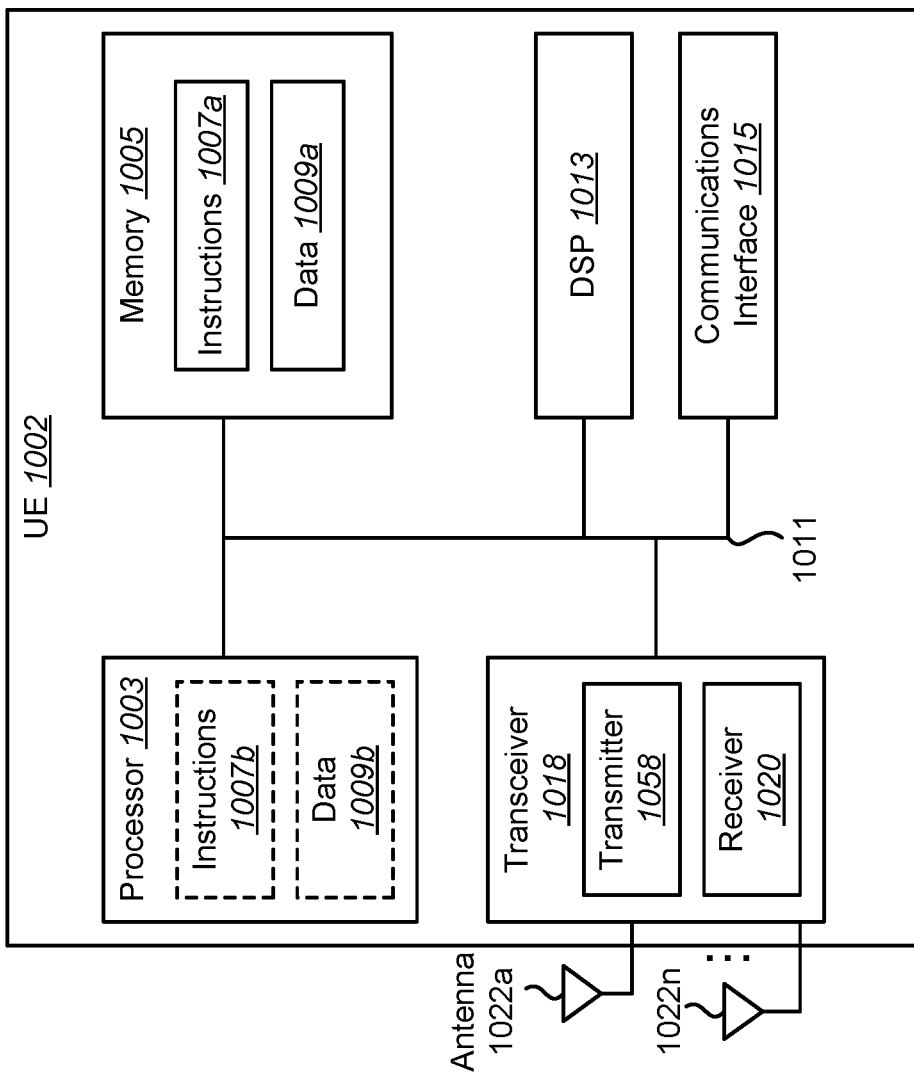
FIG. 8 illustrates various components that may be utilized in a UE.

FIG. 8 illustrates various components that may be utilized in a UE 1002. The UE 1002 described in connection with FIG. 8 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007*a* and data 1009*a* to the processor 1003. A portion of the memory 1005 may also include non-volatile random access memory (NVRAM). Instructions 1007*b* and data 1009*b* may also reside in the processor 1003. Instructions 1007*b* and/or data 1009*b* loaded into the processor 1003 may also include instructions 1007*a* and/or data 1009*a* from memory 1005 that were loaded for execution or processing by the processor 1003. The instructions 1007*b* may be executed by the processor 1003 to implement the methods described herein.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022*a-n* are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 8 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 8 is a functional block diagram rather than a listing of specific components.

Figure 9:
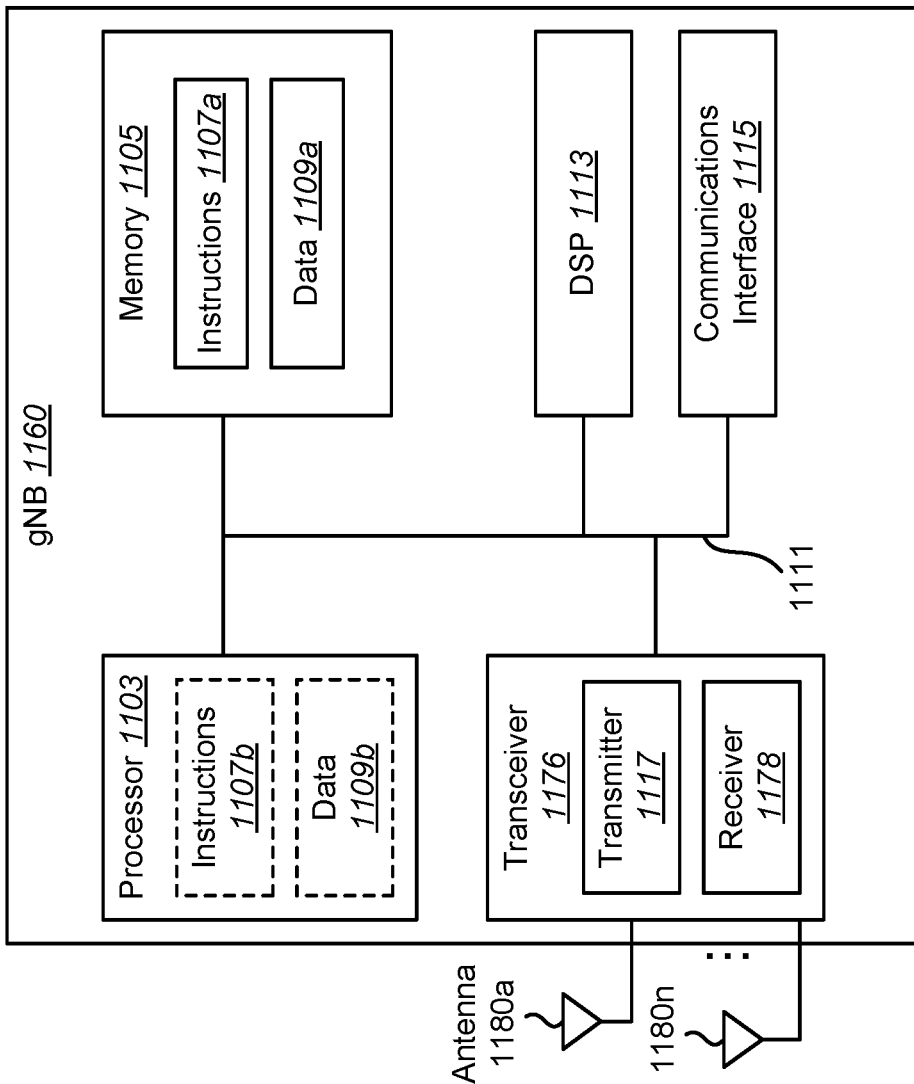
FIG. 9 illustrates various components that may be utilized in a gNB.

FIG. 9 illustrates various components that may be utilized in a gNB 1160. The gNB 1160 described in connection with FIG. 9 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107*a* and data 1109*a* to the processor 1103. A portion of the memory 1105 may also include non-volatile random access memory (NVRAM). Instructions 1107*b* and data 1109*b* may also reside in the processor 1103. Instructions 1107*b* and/or data 1109*b* loaded into the processor 1103 may also include instructions 1107*a* and/or data 1109*a* from memory 1105 that were loaded for execution or processing by the processor 1103. The instructions 1107*b* may be executed by the processor 1103 to implement the methods described herein.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180*a-n* are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 9 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 9 is a functional block diagram rather than a listing of specific components.

Figure 10:
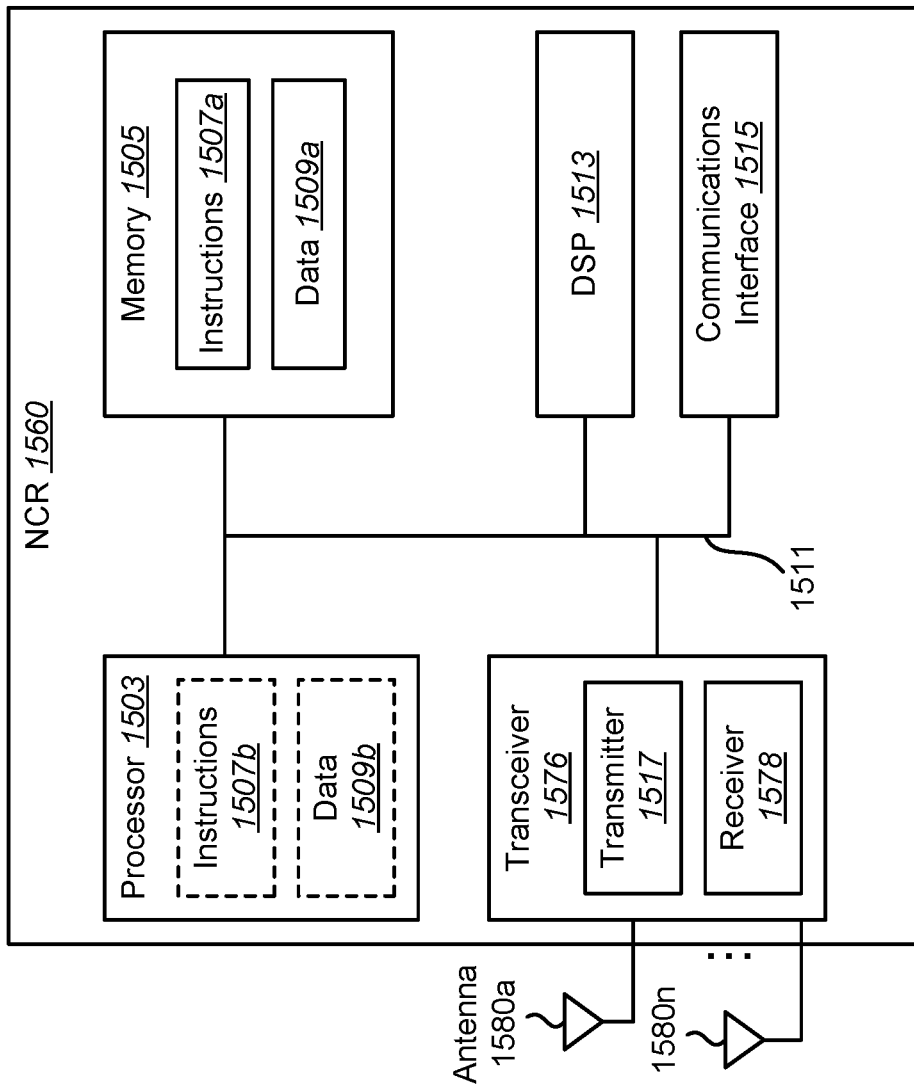
FIG. 10 illustrates various components that may be utilized in an NCR.

FIG. 10 illustrates various components that may be utilized in an NCR 1560. The NCR 1560 described in connection with FIG. 10 may be implemented in accordance with the NCR described herein. The NCR 1560 includes a processor 1503 that controls operation of the NCR 1560. The processor 1503 may also be referred to as a central processing unit (CPU). Memory 1505, which may include read-only memory (ROM), random access memory (RAM), a combination of the two or any type of device that may store information, provides instructions 1507*a* and data 1509*a* to the processor 1503. A portion of the memory 1505 may also include non-volatile random access memory (NVRAM). Instructions 1507*b* and data 1509*b* may also reside in the processor 1503. Instructions 1507*b* and/or data 1509*b* loaded into the processor 1503 may also include instructions 1507*a* and/or data 1509*a* from memory 1505 that were loaded for execution or processing by the processor 1503. The instructions 1507*b* may be executed by the processor 1503 to implement the methods described herein.

The NCR 1560 may also include a housing that contains one or more transmitters 1517 and one or more receivers 1578 to allow transmission and reception of data. The transmitter(s) 1517 and receiver(s) 1578 may be combined into one or more transceivers 1576. One or more antennas 1580*a-n* are attached to the housing and electrically coupled to the transceiver 1576.

The various components of the NCR 1560 are coupled together by a bus system 1511, which may include a power bus, a control signal bus and a status signal bus, in addition to a data bus. However, for the sake of clarity, the various buses are illustrated in FIG. 10 as the bus system 1511. The NCR 1560 may also include a digital signal processor (DSP) 1513 for use in processing signals. The NCR 1560 may also include a communications interface 1515 that provides user access to the functions of the NCR 1560. The NCR 1560 illustrated in FIG. 10 is a functional block diagram rather than a listing of specific components.

Figure 11:
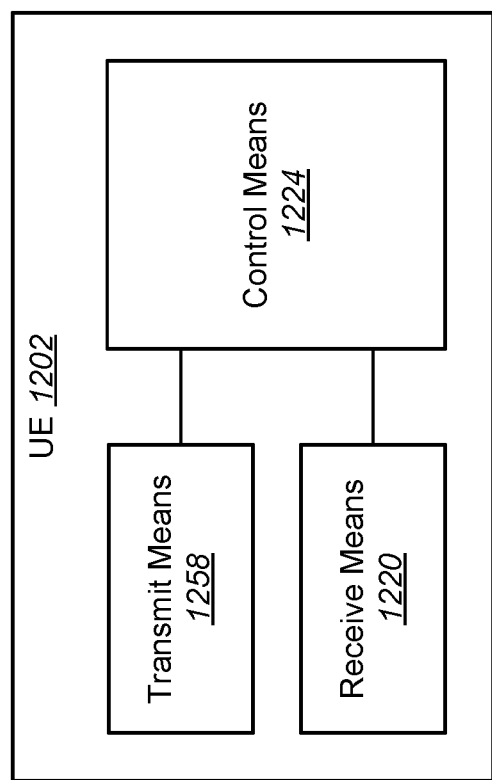
FIG. 11 is a block diagram illustrating one implementation of a UE in which one or more of the systems and/or methods described herein may be implemented.

FIG. 11 is a block diagram illustrating one implementation of a UE 1202 in which one or more of the systems and/or methods described herein may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 8 above illustrates one example of a concrete apparatus structure of FIG. 11. Other various structures may be implemented to realize one or more of the functions of FIG. 1. For example, a DSP may be realized by software.

Figure 12:
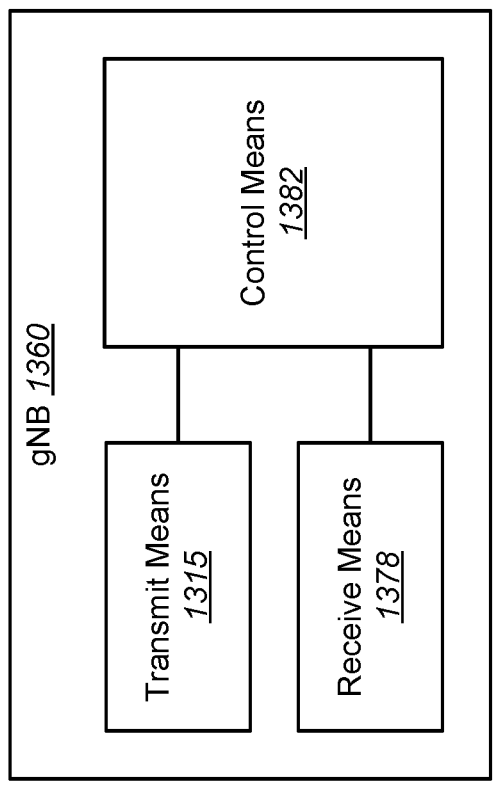
FIG. 12 is a block diagram illustrating one implementation of a gNB in which one or more of the systems and/or methods described herein may be implemented.

FIG. 12 is a block diagram illustrating one implementation of a gNB 1360 in which one or more of the systems and/or methods described herein may be implemented. The gNB 1360 includes transmit means 1315, receive means 1378 and control means 1382. The transmit means 1315, receive means 1378 and control means 1382 may be configured to perform one or more of the functions described in connection with FIG. 1 above. FIG. 9 above illustrates one example of a concrete apparatus structure of FIG. 12. Other various structures may be implemented to realize one or more of the functions of FIG. 1. For example, a DSP may be realized by software.

Figure 13:
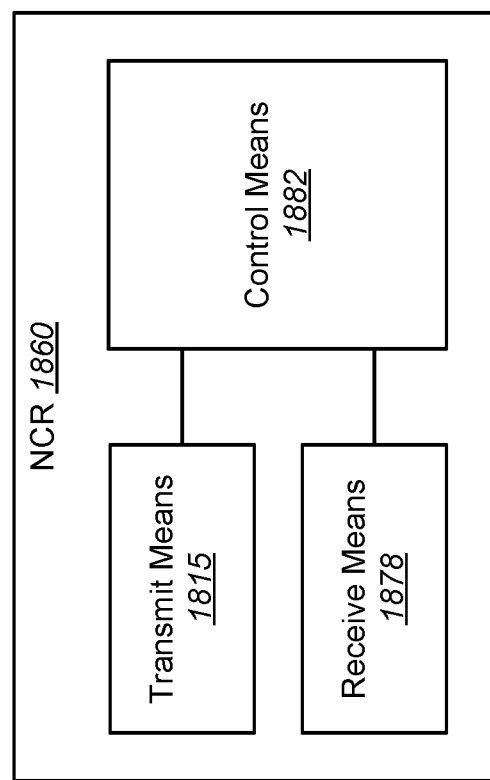
FIG. 13 is a block diagram illustrating one implementation of an NCR in which one or more of the systems and/or methods described herein may be implemented.

FIG. 13 is a block diagram illustrating one implementation of an NCR 1860 in which one or more of the systems and/or methods described herein may be implemented. The NCR 1860 includes transmit means 1815, receive means 1878 and control means 1882. The transmit means 1815, receive means 1878 and control means 1882 may be configured to perform one or more of the functions described herein. FIG. 10 above illustrates one example of a concrete apparatus structure of FIG. 13. Other various structures may be implemented to realize one or more of the functions of FIG. 1. For example, a DSP may be realized by software.

Figure 14:
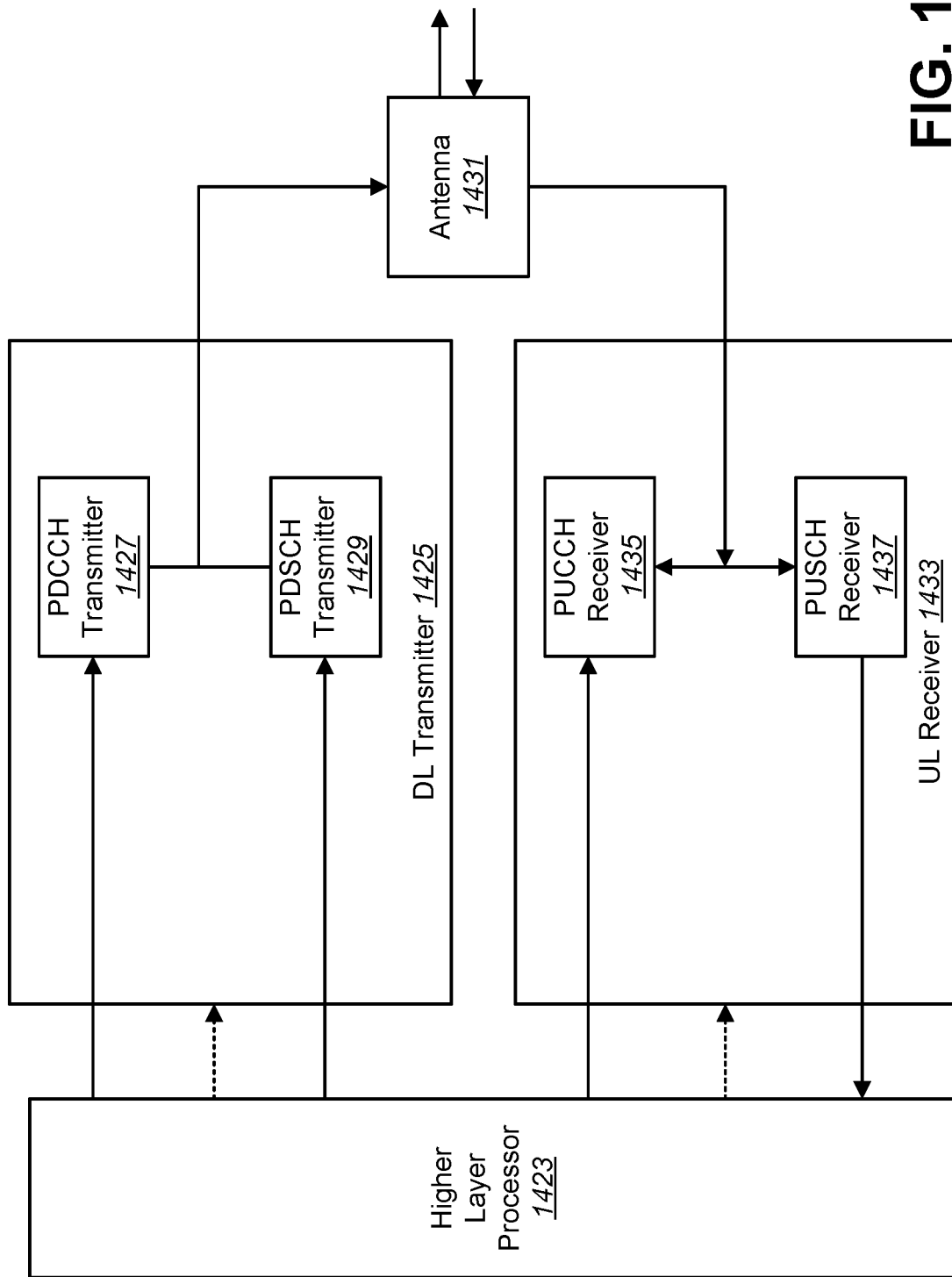
FIG. 14 is a block diagram illustrating one implementation of a gNB.

FIG. 14 is a block diagram illustrating one implementation of a gNB 1460. The gNB 1460 may be an example of the gNB 160 described in connection with FIG. 1. The gNB 1460 may include a higher layer processor 1423, a DL transmitter 1425, a UL receiver 1433, and one or more antenna 1431. The DL transmitter 1425 may include a PDCCH transmitter 1427 and a PDSCH transmitter 1429. The UL receiver 1433 may include a PUCCH receiver 1435 and a PUSCH receiver 1437.

The higher layer processor 1423 may manage physical layer's behaviors (the DL transmitter's and the UL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PDSCH transmitter transport blocks and provide the PDCCH transmitter transmission parameters related to the transport blocks.

The DL transmitter 1425 may multiplex downlink physical channels and downlink physical signals (including reservation signal) and transmit them via transmission antennas 1431. The UL receiver 1433 may receive multiplexed uplink physical channels and uplink physical signals via receiving antennas 1431 and de-multiplex them. The PUCCH receiver 1435 may provide the higher layer processor 1423 UCI. The PUSCH receiver 1437 may provide the higher layer processor 1423 received transport blocks.

Figure 15:
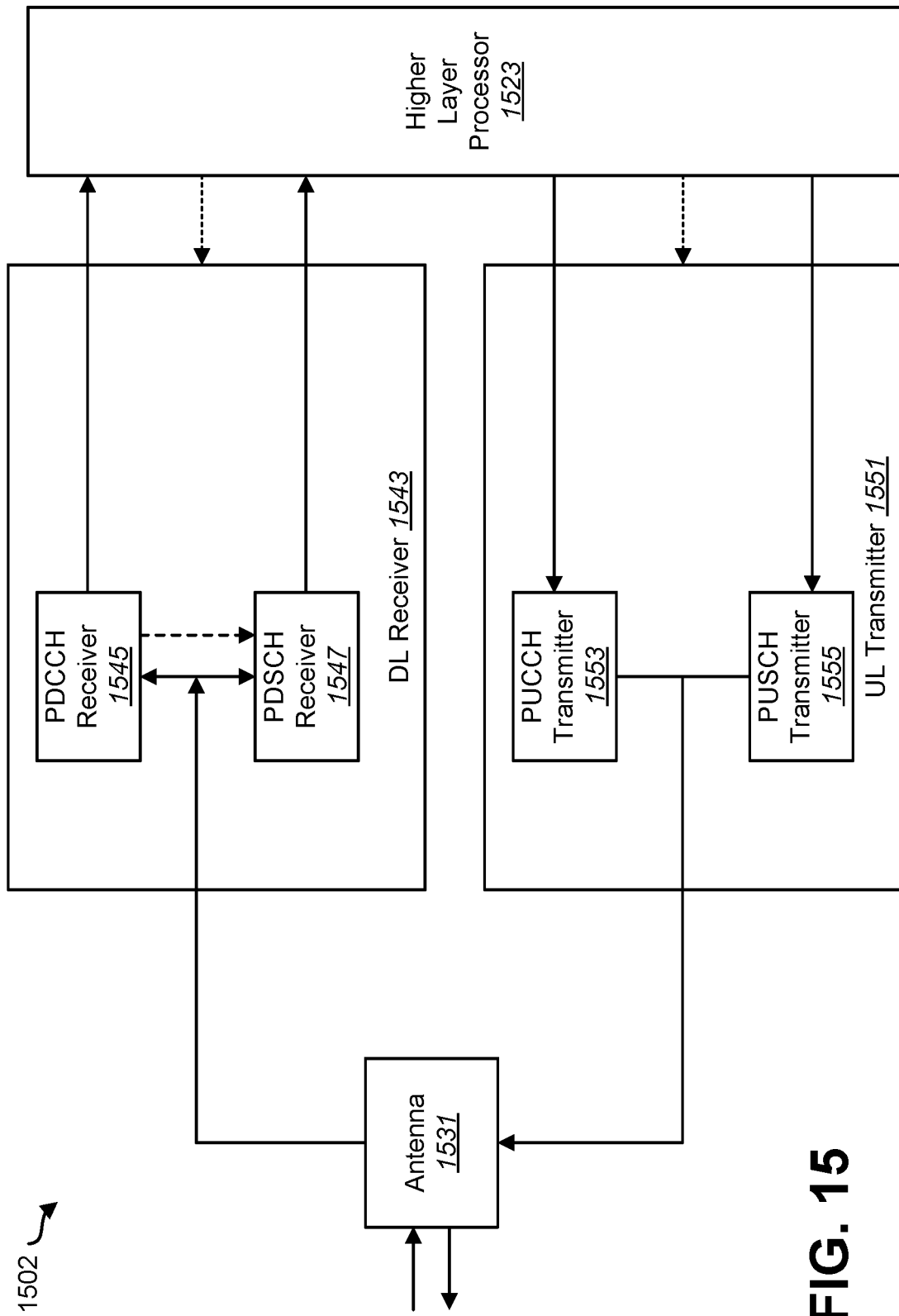
FIG. 15 is a block diagram illustrating one implementation of a UE.

FIG. 15 is a block diagram illustrating one implementation of a UE 1502. The UE 1502 may be an example of the UE 102 described in connection with FIG. 1. The UE 1502 may include a higher layer processor 1523, a UL transmitter 1551, a DL receiver 1543, and one or more antenna 1531. The UL transmitter 1551 may include a PUCCH transmitter 1553 and a PUSCH transmitter 1555. The DL receiver 1543 may include a PDCCH receiver 1545 and a PDSCH receiver 1547.

The higher layer processor 1523 may manage physical layer's behaviors (the UL transmitter's and the DL receiver's behaviors) and provide higher layer parameters to the physical layer. The higher layer processor 1523 may obtain transport blocks from the physical layer. The higher layer processor 1523 may send/acquire higher layer messages such as an RRC message and MAC message to/from a UE's higher layer. The higher layer processor 1523 may provide the PUSCH transmitter transport blocks and provide the PUCCH transmitter 1553 UCI.

The DL receiver 1543 may receive multiplexed downlink physical channels and downlink physical signals via receiving antennas 1531 and de-multiplex them. The PDCCH receiver 1545 may provide the higher layer processor 1523 DCI. The PDSCH receiver 1547 may provide the higher layer processor 1523 received transport blocks.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A network controlled repeater (NCR) comprising:
receiving circuitry configured to:
  receive a radio resource control (RRC) configuration from a gNodeB (gNB) on a control link for a configured grant (CG), including resource allocation with beam indication, and uplink (UL) forwarding delay information; and
  determine that the CG is a type 1 by receiving the ConfiguredGrantConfig-ncr including rrc-ConfiguredUplinkGrant-ncr.

2. A communication method of a network controlled repeater (NCR), comprising:
receiving a radio resource control (RRC) configuration from a gNodeB (gNB) on a control link for a configured grant (CG), including resource allocation with beam indication, and uplink (UL) forwarding delay information;
determining that the CG is a type 1 by receiving the ConfiguredGrantConfig-ncr including rrc-ConfiguredUplinkGrant-ncr; and
using the RRC configurations in transmissions.

* * * * *